US011027500B1

(12) United States Patent
Bronisz et al.

(10) Patent No.: US 11,027,500 B1
(45) Date of Patent: Jun. 8, 2021

(54) CONSTRUCTION OF STRUCTURES BY JOINING OF PRE-FORMED TAPE

(71) Applicant: Triad National Security, LLC, Los Alamos, NM (US)

(72) Inventors: Lawrence Eugene Bronisz, Los Alamos, NM (US); Laura Catherine Stonehill, Los Alamos, NM (US); Dominic S. Peterson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 287 days.

(21) Appl. No.: 16/012,228

(22) Filed: Jun. 19, 2018

Related U.S. Application Data

(60) Provisional application No. 62/521,823, filed on Jun. 19, 2017.

(51) Int. Cl.
| | | |
|---|---|---|
| *B29C 65/00* | (2006.01) | |
| *B29C 65/58* | (2006.01) | |
| *B29C 65/48* | (2006.01) | |
| *B29C 65/20* | (2006.01) | |

(52) U.S. Cl.
CPC ............ *B29C 66/435* (2013.01); *B29C 65/20* (2013.01); *B29C 65/48* (2013.01); *B29C 65/58* (2013.01); *B29C 66/1222* (2013.01); *B29C 66/12421* (2013.01); *B29C 66/21* (2013.01); *B29C 66/71* (2013.01)

(58) Field of Classification Search
CPC ... B29C 66/435; B29C 65/48; B29C 65/4825; B29C 65/50; B65H 35/006; B65H 35/0013; B65H 54/585
See application file for complete search history.

(56) References Cited

U.S. PATENT DOCUMENTS

| | | | |
|---|---|---|---|
| 2,558,367 A | 6/1951 | Borge | |
| 2,613,421 A | 10/1952 | Borge | |
| 3,070,145 A | 12/1962 | Maier | |
| 3,477,891 A | 11/1969 | Hawerkamp | |
| 3,621,884 A | 11/1971 | Trihey | |
| 4,106,709 A * | 8/1978 | Ortmanns | H01F 41/122 156/187 |
| 5,101,863 A | 4/1992 | Fujii et al. | |
| 5,121,329 A | 6/1992 | Crump | |
| 5,487,512 A * | 1/1996 | Nojiri | B29C 53/8016 242/471 |

(Continued)

OTHER PUBLICATIONS

Alexandr L. Makarov et al., "Spacecraft dynamics due to elastic ring antenna deployment," Acta Astronautica 69, pp. 691-702 (2011).

(Continued)

*Primary Examiner* — Alex B Efta
(74) *Attorney, Agent, or Firm* — LeonardPatel PC; Michael A. Leonard, II; Sheetal S. Patel

(57) ABSTRACT

Various components, such as radio frequency (RF) or thermal reflectors, may be constructed from joining of pre-formed tape. For reflectors, this process may reduce the number of ribs, only require partial ribs, or eliminate the use of ribs altogether. To build such a reflector, a spool of tape, a joining tractor, and a foundation ring may be employed.

17 Claims, 26 Drawing Sheets

(56) References Cited

U.S. PATENT DOCUMENTS

| | | | | |
|---|---|---|---|---|
| 5,491,880 | A * | 2/1996 | Labiche | B29C 63/10 |
| | | | | 156/282 |
| 6,901,985 | B2 * | 6/2005 | Eckart | H01B 13/01281 |
| | | | | 156/392 |
| 7,905,266 | B2 * | 3/2011 | Sugiyama | B65B 27/06 |
| | | | | 156/428 |
| 8,622,440 | B2 * | 1/2014 | Crichton | B65B 13/02 |
| | | | | 289/1.5 |
| 8,689,841 | B2 | 4/2014 | Bortz | |
| 2004/0105975 | A1 * | 6/2004 | Vulpitta | B65H 75/10 |
| | | | | 428/343 |
| 2012/0186750 | A1 * | 7/2012 | Kamiyama | A45D 8/36 |
| | | | | 156/446 |

OTHER PUBLICATIONS

Geoffrey Marks et al., "Performance of the Astromesh Deployable Mesh Reflector at KA-Band Frequencies and Above," http://www.northropgrumman.com/BusinessVentures/AstroAerospace/Documents/pageDocs/tech_papers/tech_papers_AMLiteDe.pdf (last accessed May 24, 2017).

* cited by examiner

1600

1700

1800

CONSTRUCTION OF STRUCTURES BY JOINING OF PRE-FORMED TAPE

CROSS-REFERENCE TO RELATED APPLICATION

This application claims the benefit of U.S. Provisional Patent Application No. 62/521,823 filed Jun. 19, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to deployable components and lightweight structures, and more specifically, to components, such as radio frequency (RF) or thermal reflectors, constructed from joining of pre-formed tape, and methods for their construction.

BACKGROUND

Conventional reflectors, such as high-gain space antennas and certain terrestrial reflectors, tend to be deployable structures. For instance, the ATS-6 satellite deployed a 9-meter ribbed parabolic mesh reflector in 1974 that was collapsed at launch and folded outwards to deploy once in orbit. Such ribbed parabolic mesh reflectors also typically require increased spacecraft length, which consumes more payload space and potentially increases cost of orbital insertion. The Northrop Grumman AstroMesh™ family also provides deployable reflectors, but these reflectors are still relatively bulky when stowed.

Accordingly, improved reflectors and methods for their construction may be beneficial.

SUMMARY

Certain embodiments of the present invention may provide solutions to the problems and needs in the art that have not yet been fully identified, appreciated, or solved by conventional reflectors. For example, some embodiments of the present invention pertain to components, such as RF or thermal reflectors, constructed from edge joining of pre-formed tape, as well as methods for their construction.

In an embodiment, an apparatus includes a spool that includes tape. The spool is configured to dispense the tape. The apparatus also includes a joining tractor configured to receive the tape from the spool and join a newly dispensed section tape to an adjacent inner section of the tape or to a foundation ring. The joining tractor is configured to move along the foundation ring, and subsequently, the adjacent inner section of tape, to attach a next section of the tape outside of the foundation ring or the adjacent inner section of the tape.

In another embodiment, a system for creating a structure with tape includes a foundation ring that provides a foundation for the structure and a spool containing tape. The spool is configured to dispense the tape. The system also includes a joining tractor configured to receive the tape and join newly dispensed tape from the spool to an adjacent inner section of the tape or to the foundation ring. The joining tractor is configured to move along the foundation ring, and subsequently, the adjacent inner section of the tape to attach the newly dispensed tape outside of the foundation ring or the adjacent inner section of the tape.

In yet another embodiment, an apparatus includes a spool that includes tape. The spool is configured to dispense the tape. The apparatus also includes a joining tractor configured to receive the tape from the spool and join a newly dispensed section tape to an adjacent inner section of the tape or to a foundation ring. The apparatus further includes a computing system configured to control operation of the apparatus. The joining tractor is configured to move along the foundation ring, and subsequently, the adjacent inner section of tape, to attach a next section of the tape outside of the foundation ring or the adjacent inner section of the tape.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
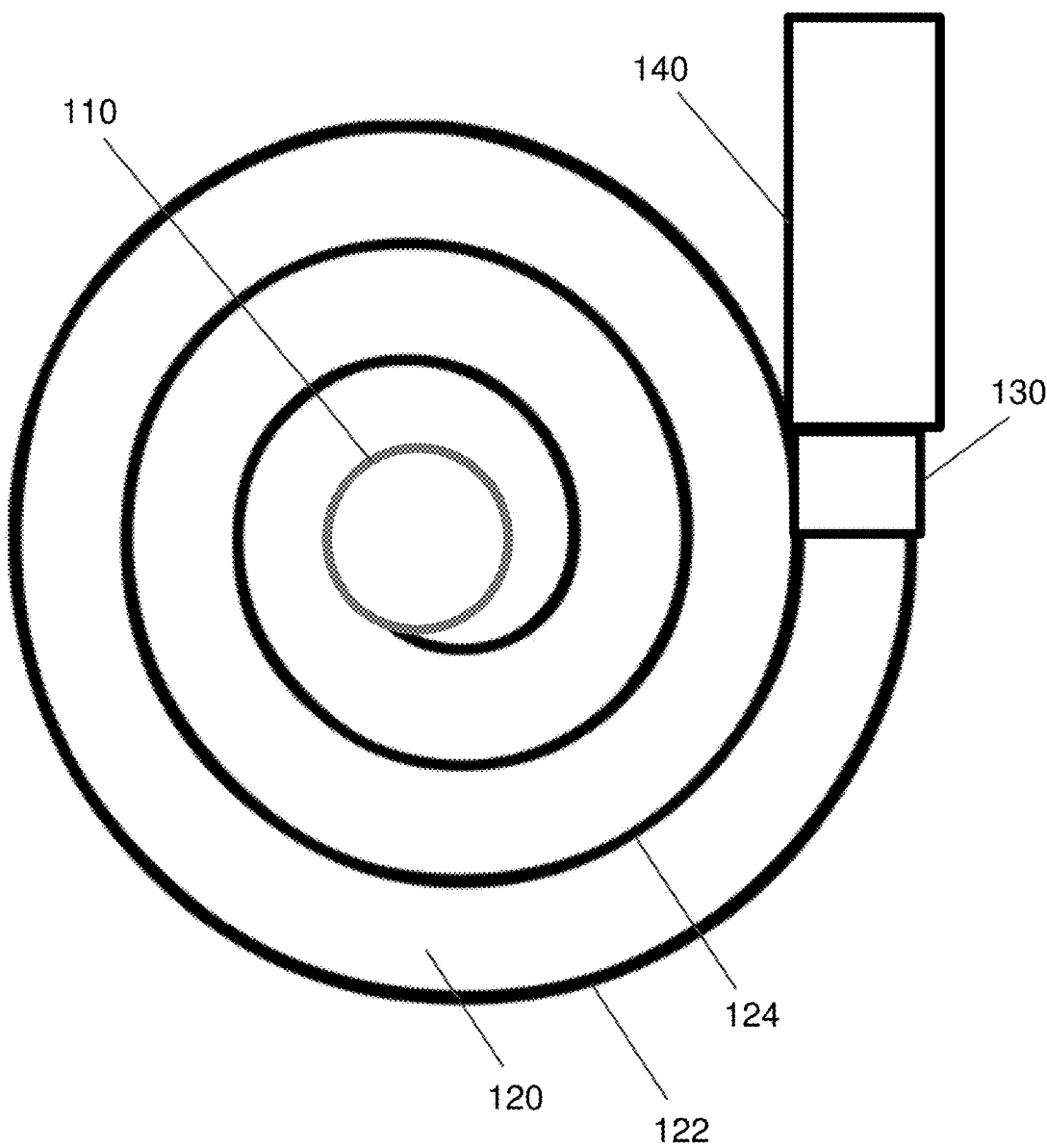
FIG. 1 is a top view of a tape-based reflector during construction, according to an embodiment of the present invention.

Some embodiments of the present invention pertain to RF or thermal reflectors constructed from joining of pre-formed tape. Tape may be joined with an adjacent layer at an edge thereof, at a location other than at the edge of the tape, or both. Joining tape in a location other than an edge may be particularly useful for creating conical structures, for instance. More generally, some embodiments pertain to constructing various components for terrestrial or aerospace applications using tape. The tape may be pre-formed or may be bent and/or rolled into shape upon deployment. For reflectors, some embodiments may reduce the number of ribs, only require partial ribs, or eliminate the use of ribs altogether.

Constructing RF or thermal reflectors on orbit by a hybrid, additive assembly method in some embodiments represents a novel technology and process. This affordable, novel method can deploy tape, assembling the tape into a parabolic shape. The shape, and therefore, the focal length and diameter, can conceivably be determined post-launch at the time of fabrication in some embodiments. Some embodiments may be applicable to S-band frequencies and Evolved Expendable Launch Vehicle (EELV) Secondary Payload Adapter (ESPA)-class satellites, but any suitable space vehicle application may be served without deviating from the scope of the invention. This revolutionary aperture potentially provides a disruptive advantage, especially for small/medium space assets.

Appropriate materials and geometries may be selected for the particular application. The materials may be monolithic or mesh structures, allowing substantial elasticity in desired axes. Materials may include, but are not limited to, metals, alloys, polymers, conductive polymers, coated polymers, meshes, and extrusions. Joining may be performed using adhesives, heat melting, snap-locking, hook-and-loop fasteners (e.g., Velcro™), and/or any other suitable joining mechanism or approach without deviating from the scope of the invention.

Some embodiments rapidly construct components upon deployment using an additive manufacturing (AM) technique. For instance, to construct a parabolic reflector, some embodiments perform an AM spiral edge joining technique using a spool (e.g., with a core or not, within a container or not, etc.) of pre-formed tape, a joining mechanism, a joining tractor, and a foundation ring (e.g., a retaining ring) to begin spiral assembly. While the term "ring" is used here, it should be noted that within the meaning of "ring" as used herein, the foundation ring or retaining ring may be any suitable shape without deviating from the scope of the invention (e.g., elliptical, non-planar, irregular, an open-ended geometric shape (e.g., a line or an arc, a spline, a combination of concatenated such shapes, etc. that does not terminate back on the structure), etc.). The spool may be planar or non-planar (e.g., conical—see FIG. 4). Preliminary calculations show that a 0.6 meter diameter cartridge that is 60 mm wide could hold sufficient tape to fabricate a parabola approximately 10 meters in diameter (assuming tape that is 100 microns thick, 50 mm wide, and single-spooled with a volumetric packing efficiency of 80%).

Some embodiments may form reflector objects for terrestrial antennas. Some embodiments may also form non-parabolic structures, such as rectilinear panels, flat surfaces, cylinders, cones, etc. Embodiments are not limited to the construction of reflectors. For instance, in some embodiments, more complex structures may be created, such as enclosures for terrestrial structures, space modules for a space station or space vehicle, structures where the joining tractor cuts the tape and starts running again in a different location, structures where the joining tractor loops and/or twists plain tape back upon a previous edge, structures where the joining tractor loops and/or twists Tongue-in-Groove (TiG) tape back upon a previous edge provided with TiG features on both sides of the tape, or any desired terrestrial or space structure without deviating from the scope of the invention. In some embodiments, non-contiguous structures, such as loops, may be created where the joining tractor makes one or more loops, cuts the tape, starts again, etc. Quasi-planar geometries may also be created by first assembling cylinders or cones and then substantially flattening them.

FIG. 1 is a top view of a tape-based reflector 100 during construction, according to an embodiment of the present invention. Reflector 100 includes a foundation ring 110 (shown here in gray to more readily distinguish it from the tape) and tape 120 having an outer edge 122 and an inner edge 124. Again, while a circular ring is shown here, within the definition of "ring" as used herein, any other desired shape may be used without deviating from the scope of the invention. A joining tractor 130 deploys tape from a spool 140 and joins an inner edge of newly deployed tape to a previous ring of the tape using fuse deposition manufacturing (FDM), for instance, where adjacent edges are melted and bonded. See, for example, U.S. Pat. No. 5,121,329 for a nonlimiting example of an FDM process. Alternatively, in some embodiments, tape 120 may have zipper-type edges where outer edge 122 is configured to connect to inner edge 124. Initially, joining tractor 130 would also connect a first ring, or wrap, of tape 120 to foundation ring 110. It should be noted that retaining ring 110, tape 120, joining tractor 130, and spool 140 are not necessarily drawn to scale, but may be enlarged in this view for illustration purposes only. It should also be noted that while the term "tape" is used here, the tape may be made of any suitable material for the purpose of the reflector or other component, including, but not limited to, metals, alloys, coated polymers, meshes, and/or extrusions. Indeed, tape may be extruded during construction, for instance. Joining tractor 130 may be powered by its own internal power supply (e.g., batteries and/or solar cells), powered by an umbilical to a power source of a space vehicle (if used for space applications), or both.

Tape 120 may be pre-formed along some or all of its length to have the desired yaw radius or camber based on the position of the respective section of tape (i.e., the closer wraps are to foundation ring 110, the smaller the yaw radius or the greater the camber, and the further wraps are from foundation ring 110, the larger the yaw radius or the lesser the camber). If the tape is appropriately pre-tensioned to have the desired cross-curvature and camber using the appropriate material, it will elastically tend to return to its pre-tensioned shape. This assists joining tractor 130 in joining consecutive wraps together. This concept can be thought of as similar to a metal roll of measuring tape, which has a "C" shape when deployed and is flat when spooled, but with yaw pre-tensioning incorporated as well.

In some embodiments, the joining tractor may hold itself in place on the retaining ring and then on the tape. This may be accomplished by juxtaposed rollers (see FIG. 5C), or a roller juxtaposed with a foot (see FIG. 6), which allows the tape to slide. The joining tractor may be initially connected to the retaining ring prior to deployment. At least one of the juxtaposed rollers may be configured to provide propulsion for the joining tractor in some embodiments.

In some embodiments, the spool and joining tractor are part of the same device. In other embodiments, the spool and joining tractor may be separate. In embodiments where the spool and joining tractor are separate, the spool may be operably connected to the body of the space vehicle or other structure on which the tape-based construct is to be built. This may allow the joining tractor to be smaller and lighter.

Figure 2:
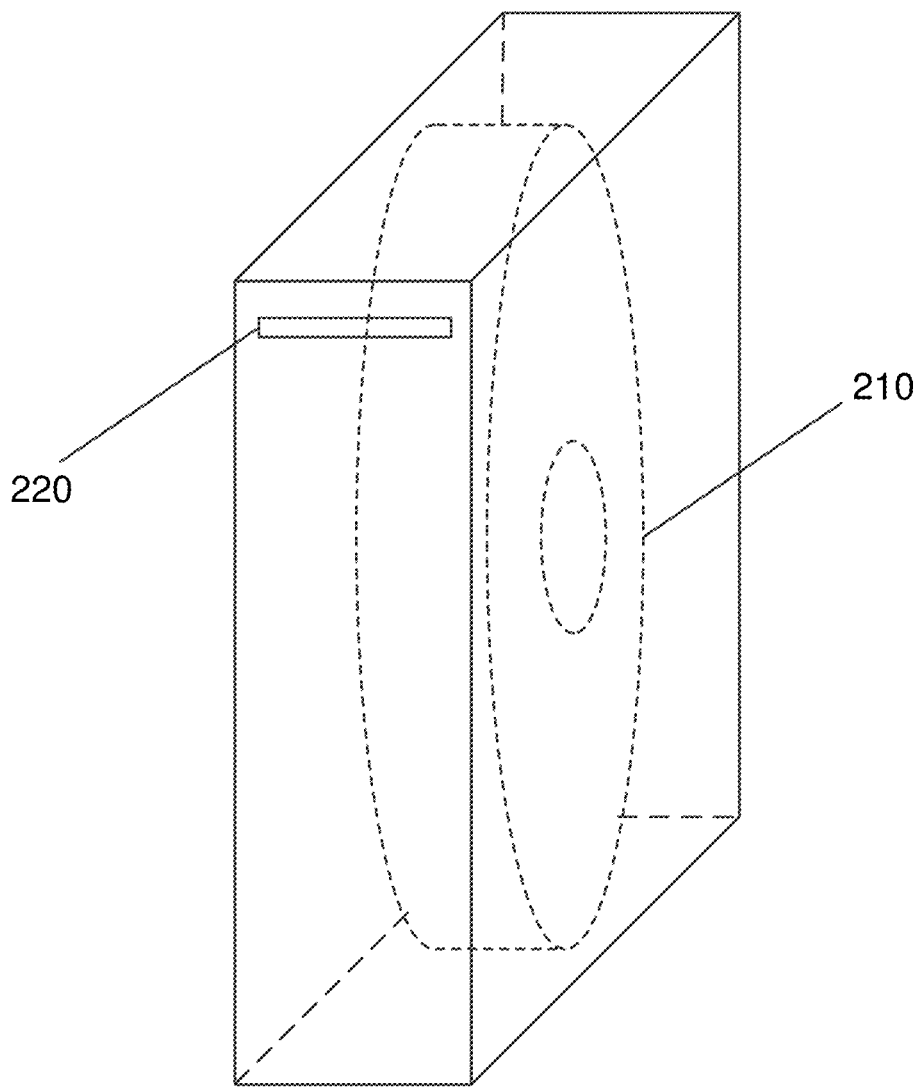
FIG. 2 is a see-through perspective view illustrating a tape dispenser and a spool, according to an embodiment of the present invention.
Figure 3:
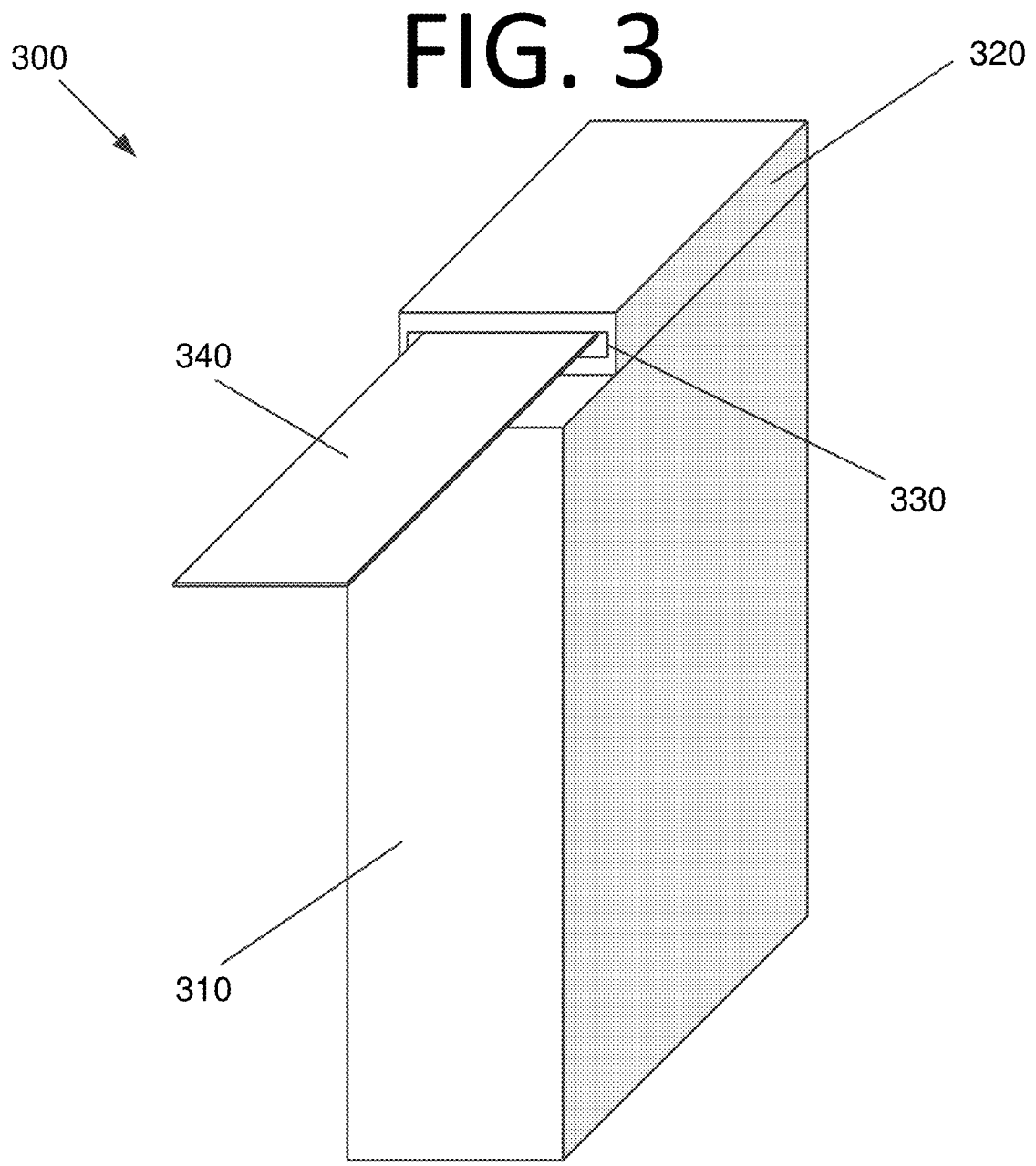
FIG. 3 is a perspective view illustrating a tape dispenser, according to an embodiment of the present invention.

FIG. 2 shows the basic concept of a tape dispenser 200 with a spool of tape 210. Tape 210 exits tape dispenser 200 via an opening 202. While tape dispenser is shown as having a box shape here, any shape suitable for holding and dispensing tape may be used without deviating from the scope of the invention. FIG. 3 shows another design for a tape dispenser 300. Tape dispenser 300 includes a spool housing 310 that houses a spool of tape (not visible). A dispensing housing 320 has an opening 330 through which tape 340 exits tape dispenser 300.

Figure 4:
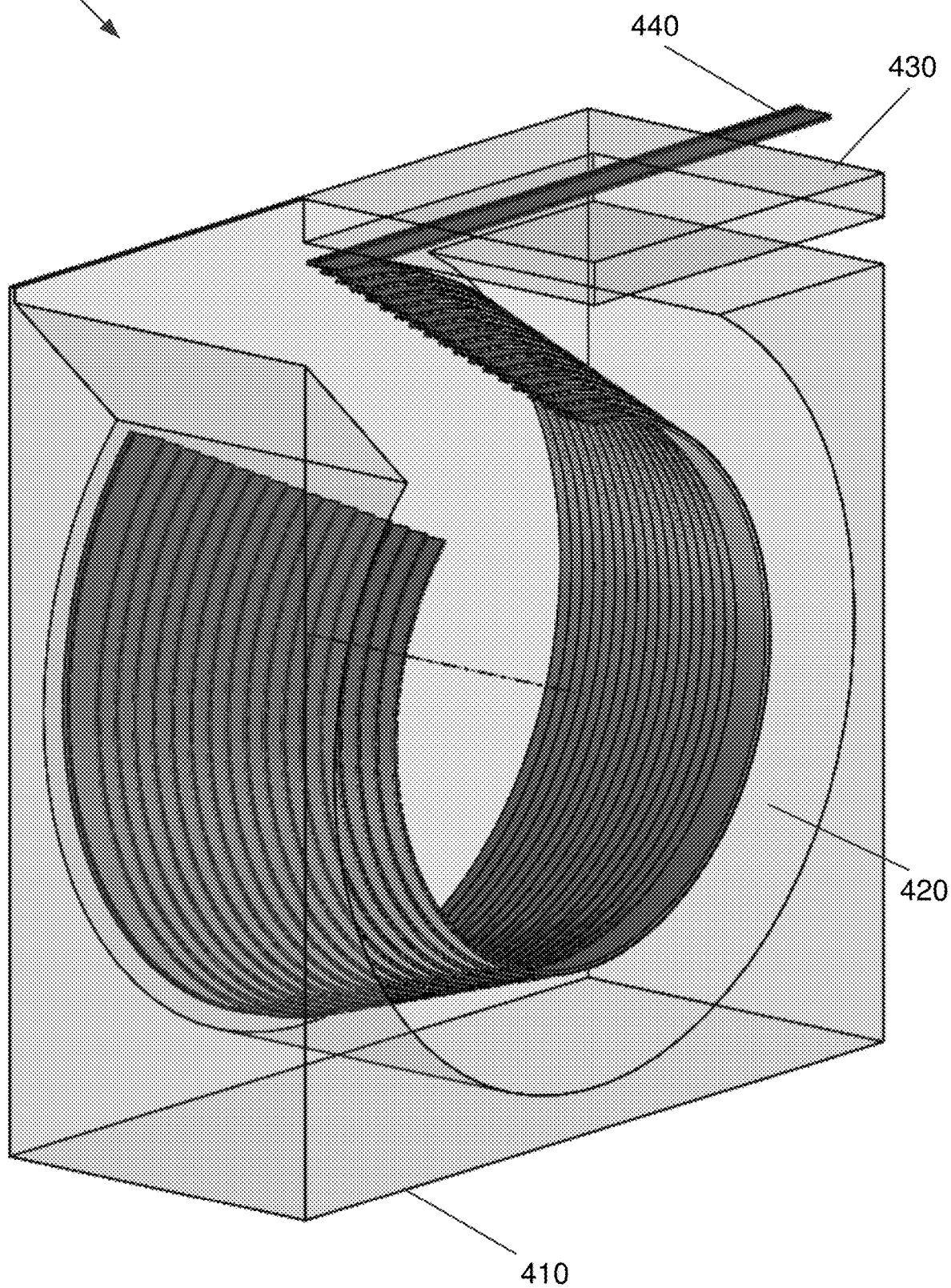
FIG. 4 is a partially transparent perspective view illustrating a tape dispenser, according to an embodiment of the present invention.

FIG. 4 is a partially transparent perspective view illustrating a tape dispenser 400, according to an embodiment of the present invention. In this embodiment, tape 440 is stored in a tapered, or conical, configuration within a cavity 420 defined by outer portion 410. A tape guide 430 assists tape 440 in exiting tape dispenser 440 in a generally horizontal direction.

Figure 5A:
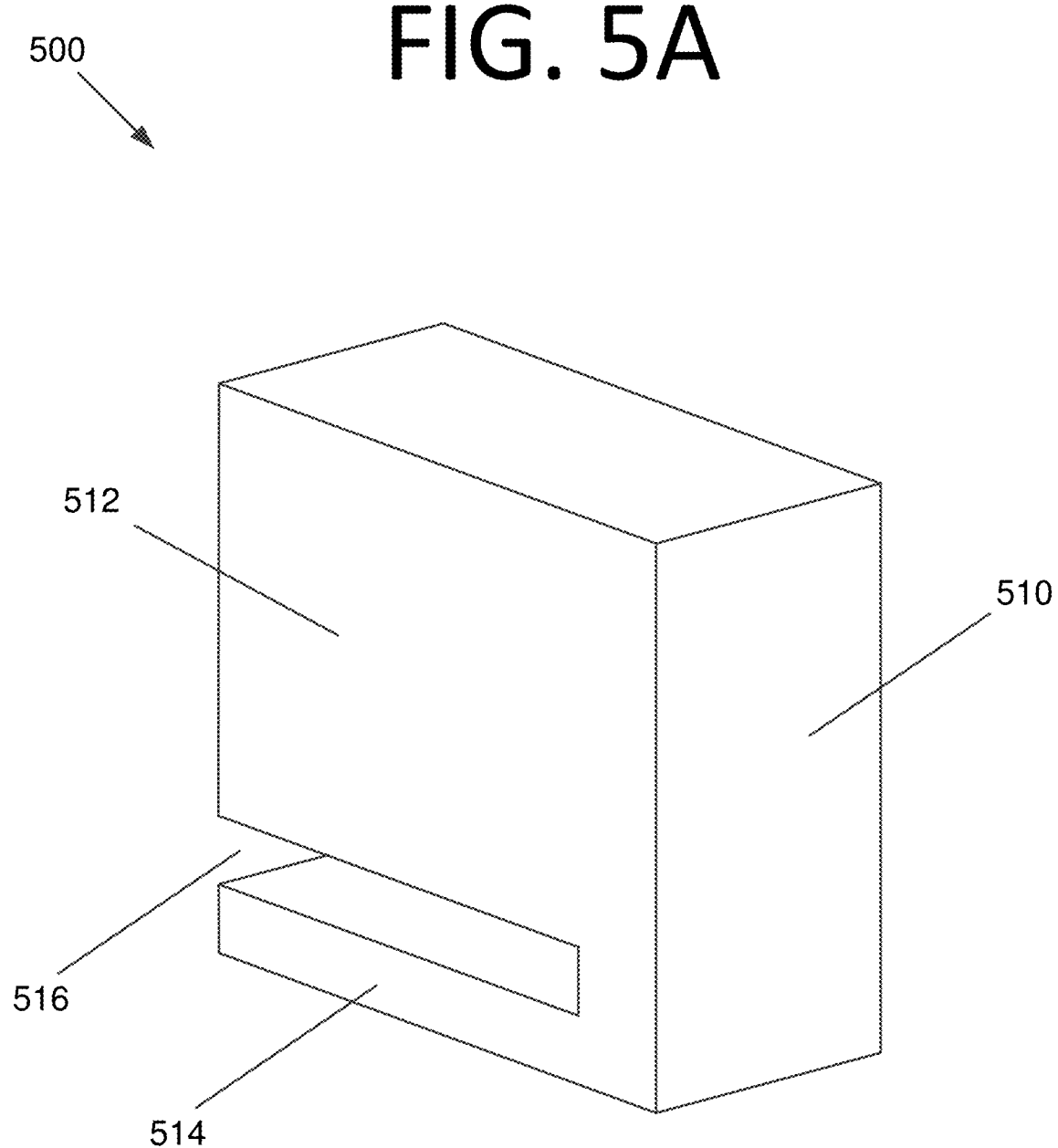
FIG. 5A is a perspective view illustrating a joining tractor, according to an embodiment of the present invention.
Figure 5B:
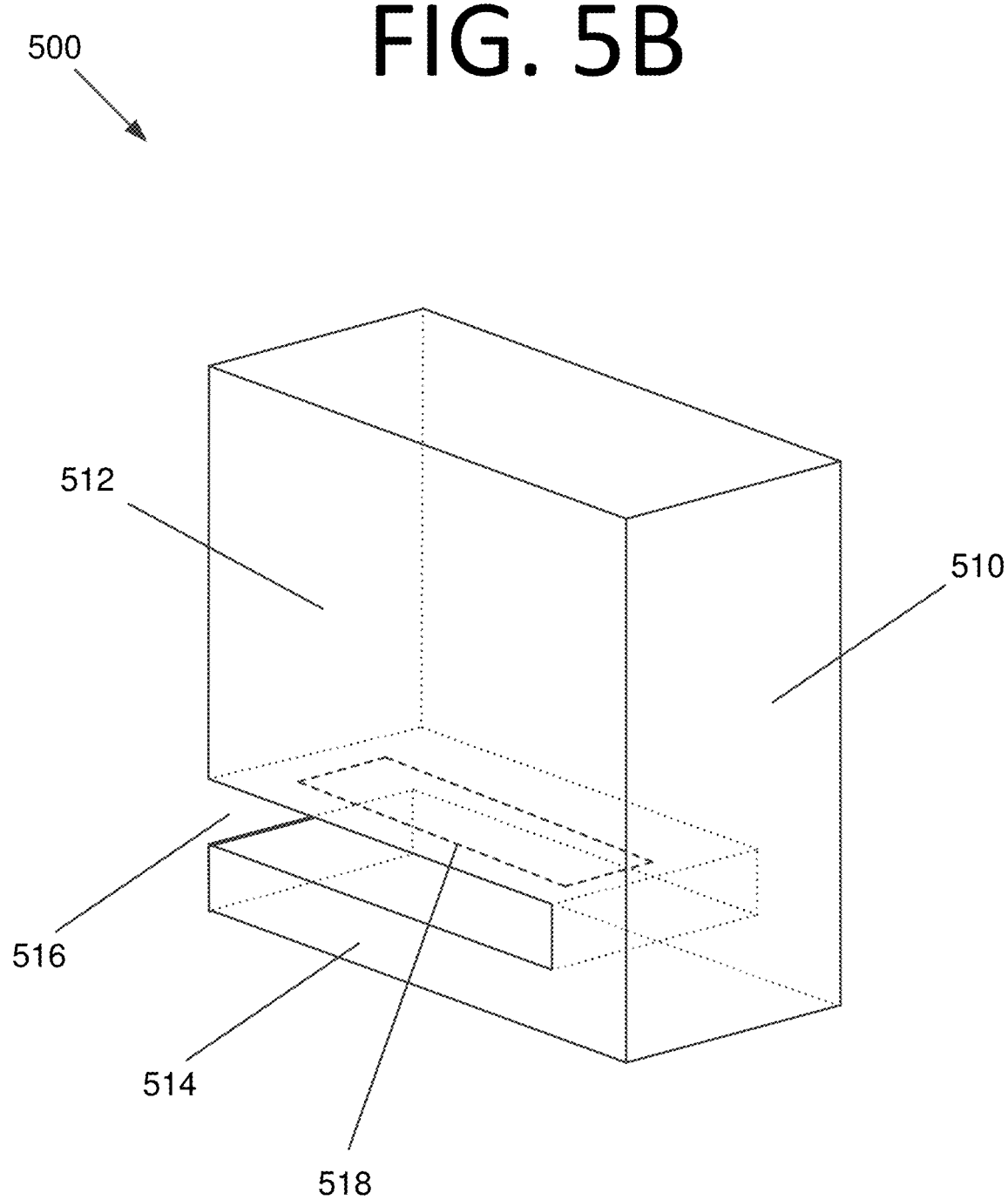
FIG. 5B is a see-through perspective view of the joining tractor of FIG. 5A with the internal components removed, according to an embodiment of the present invention.
Figure 5C:
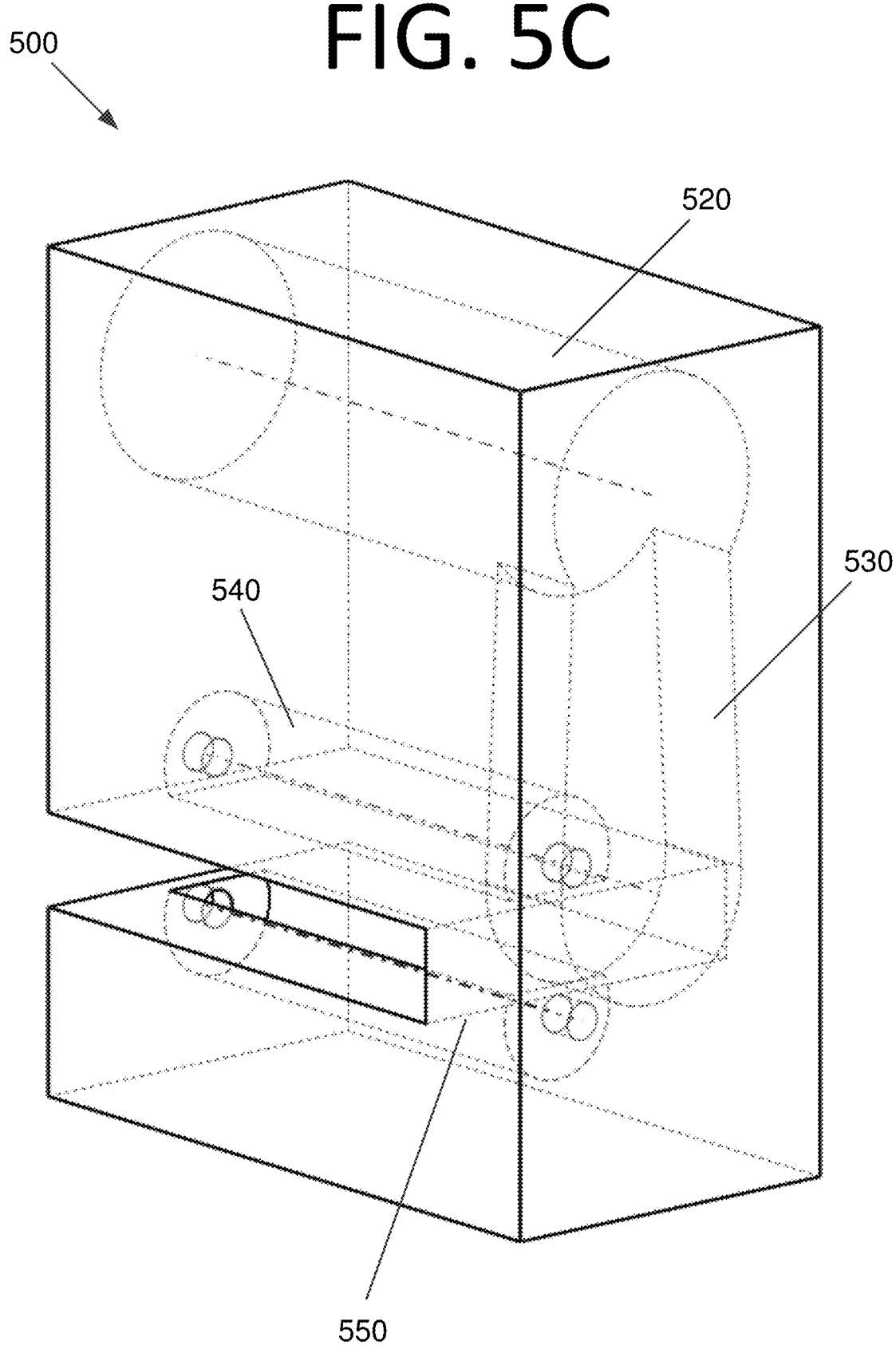
FIG. 5C is a see-through perspective view of the joining tractor of FIG. 5A with the internal components added, according to an embodiment of the present invention.

FIGS. 5A-C illustrate a joining tractor 500, according to an embodiment of the present invention. Components of joining tractor 500 are not necessarily drawn to scale and are shown here in their shape and size for illustration purposes only. Joining tractor 500 includes a housing 510 that has an upper portion 512 that houses internal components and a lower portion 514. Upper portion 512 and lower portion 514 have a recess 516 therebetween, through which the previous wrap of tape and a current wrap of tape to be joined pass. Upper portion 512 also includes a recess 518.

Turning to FIG. 5C, upper portion 512 houses a motor roller 520 (motor not shown) and an upper roller 540. Motor roller 520 may be driven by a brushless electric motor or any other suitable motor without deviating from the scope of the invention. A belt 530 drives upper roller 540 as motor roller 520 rotates. Lower portion 550 houses a lower roller 550 that is opposite upper roller 540. Upper roller 540 and lower roller 550 collectively hold tape in place as it is deployed on the reflector or other structure.

Figure 6:
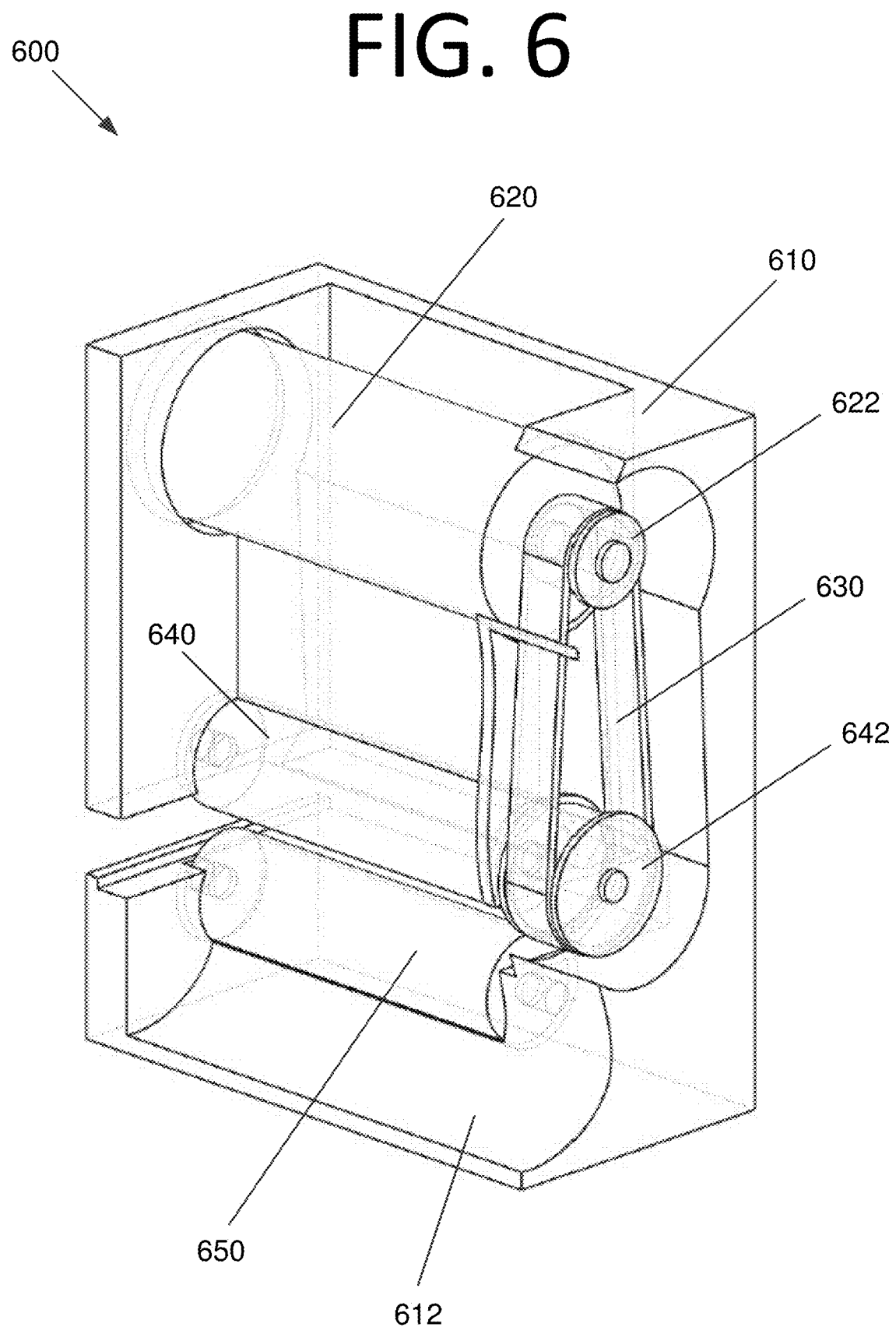
FIG. 6 is a perspective view illustrating a joining tractor, according to an embodiment of the present invention.

FIG. 6 is a perspective view illustrating a joining tractor 600, according to an embodiment of the present invention. Similar to joining tractor 500 of FIGS. 5A-C, joining tractor 600 includes a motor roller 620 and an upper roller 640. A belt 630 (e.g., a band, a chain, etc.) drives upper roller 640 as motor roller 620 rotates. Lower portion 612 of housing 610 houses a lower roller 650 that is opposite upper roller 640. However, most of the components in the upper portion of housing 610 are open and accessible in this embodiment.

Figure 7:
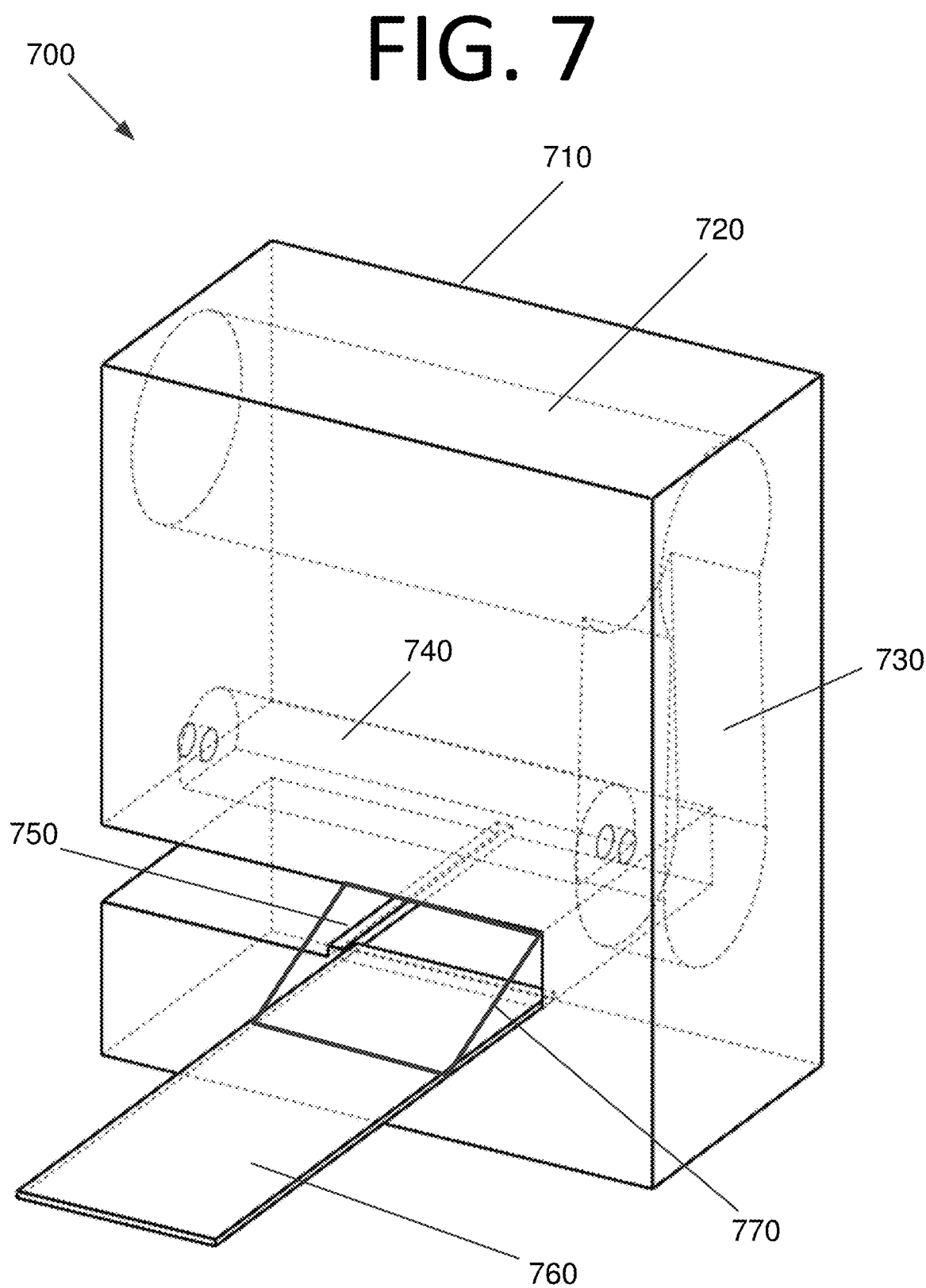
FIG. 7 is a see-through perspective view illustrating a joining tractor, according to an embodiment of the present invention.

FIG. 7 is a see-through perspective view illustrating a joining tractor 700, according to an embodiment of the present invention. Similar to joining mechanisms 500 and 600 of FIGS. 5A-C and 6, respectively, joining tractor 700 includes a housing 710, a motor roller 720, a belt 730, and an upper roller 740. However, instead of using a lower roller, joining tractor 700 employs a foot 750 to assist in holding tape 760 in place. A cutting mechanism 770 (e.g., a blade) cuts tape 760 when desirable during construction.

Figure 8:
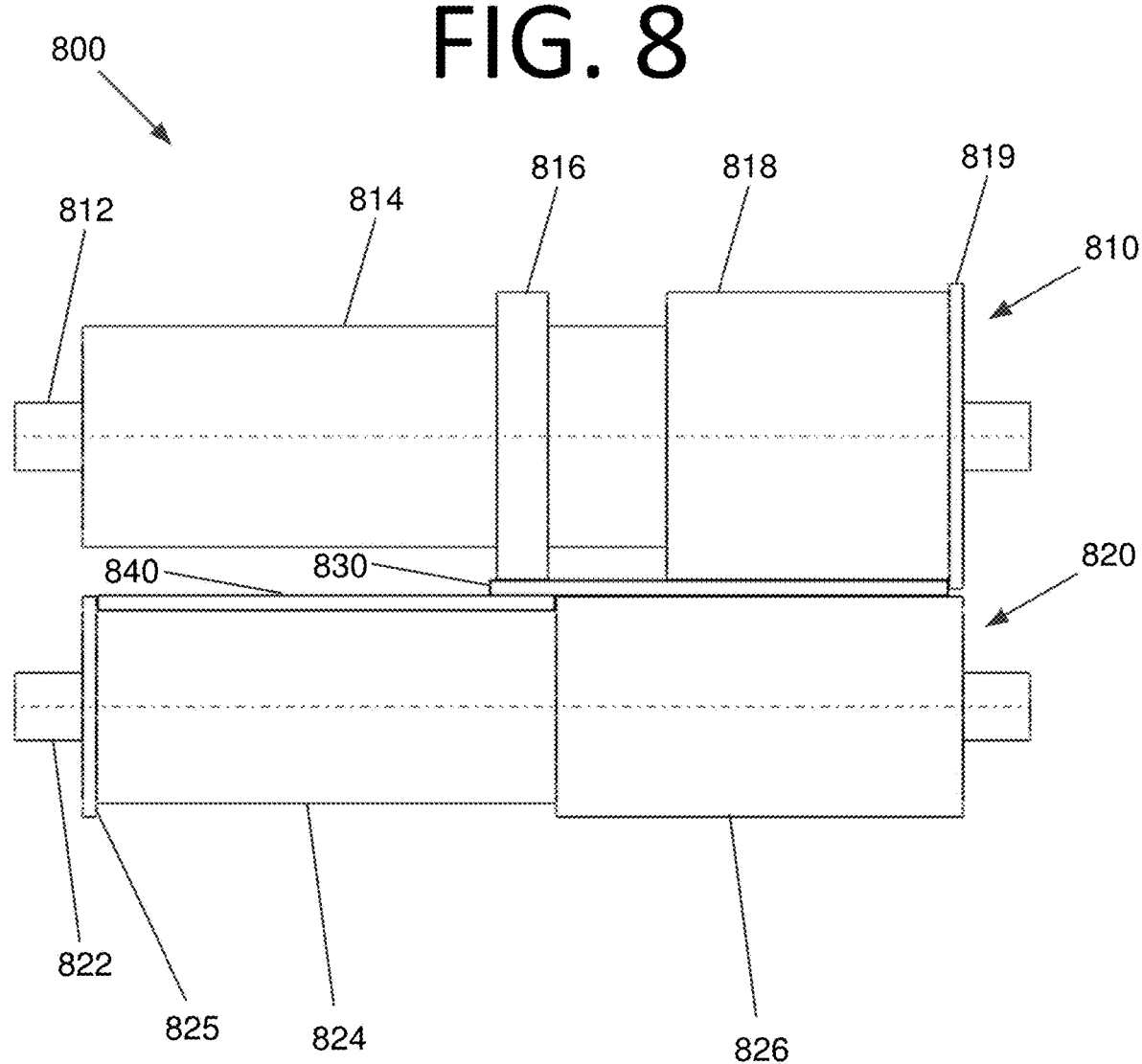
FIG. 8 is a side view illustrating a heated roller assembly, according to an embodiment of the present invention.

Various roller designs may be employed in some embodiments. FIG. 8 is a side view illustrating a heated roller assembly 800, according to an embodiment of the present invention. Heated roller assembly 800 includes an upper roller 810 and a lower roller 820. Upper roller 810 includes a shaft 812 about which it rotates and an inner cylinder 814. Inner cylinder includes a heating element 816 and an outer cylinder 818. Outer cylinder 818 and a lip 819 to help hold an outer section of tape 830 in place. Heating element 816 joins outer section of tape 830 to an inner section of tape 840. However, per the above, in some embodiments, the position of heating element is such that non-edge portions of tape 830, 840 are joined. Additionally, or alternatively, heating element may be movable via an actuator (not shown) to join different portions of tape 830, 840 as desired curing construction.

Lower roller 820 includes a shaft 822 about which it rotates and an inner cylinder 824. Inner cylinder 824 and a lip 825 hold inner section of tape 840 in place, along with a portion of an outer cylinder 826. Outer cylinder 826 also helps to hold outer section of tape 830 in place in conjunction with outer cylinder 818.

Figure 9A:
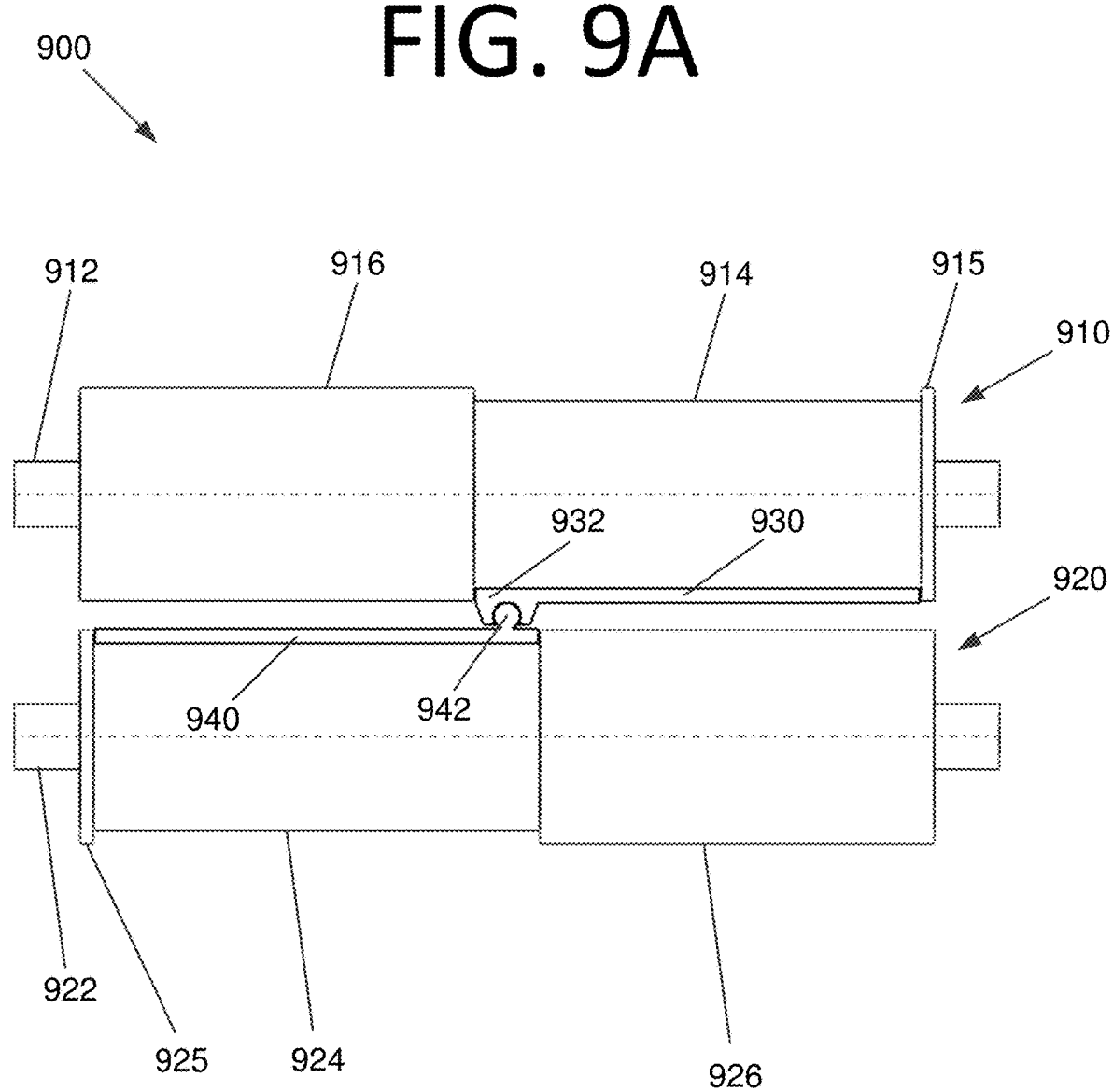
FIG. 9A is a side view illustrating a Tongue-in-Groove (TiG) roller assembly, according to an embodiment of the present invention.

FIG. 9A is a side view illustrating a TiG roller assembly 900, according to an embodiment of the present invention. TiG roller assembly 900 includes an upper roller 910 and a lower roller 920. Upper roller 910 includes a shaft 912 about which it rotates and an inner cylinder 914. Inner cylinder 914 includes a lip 915 to help hold an outer section of tape 930 in place. Upper roller 910 also includes an outer cylinder 916, a side of which also helps hold outer section of tape 930 in place.

Figure 9B:
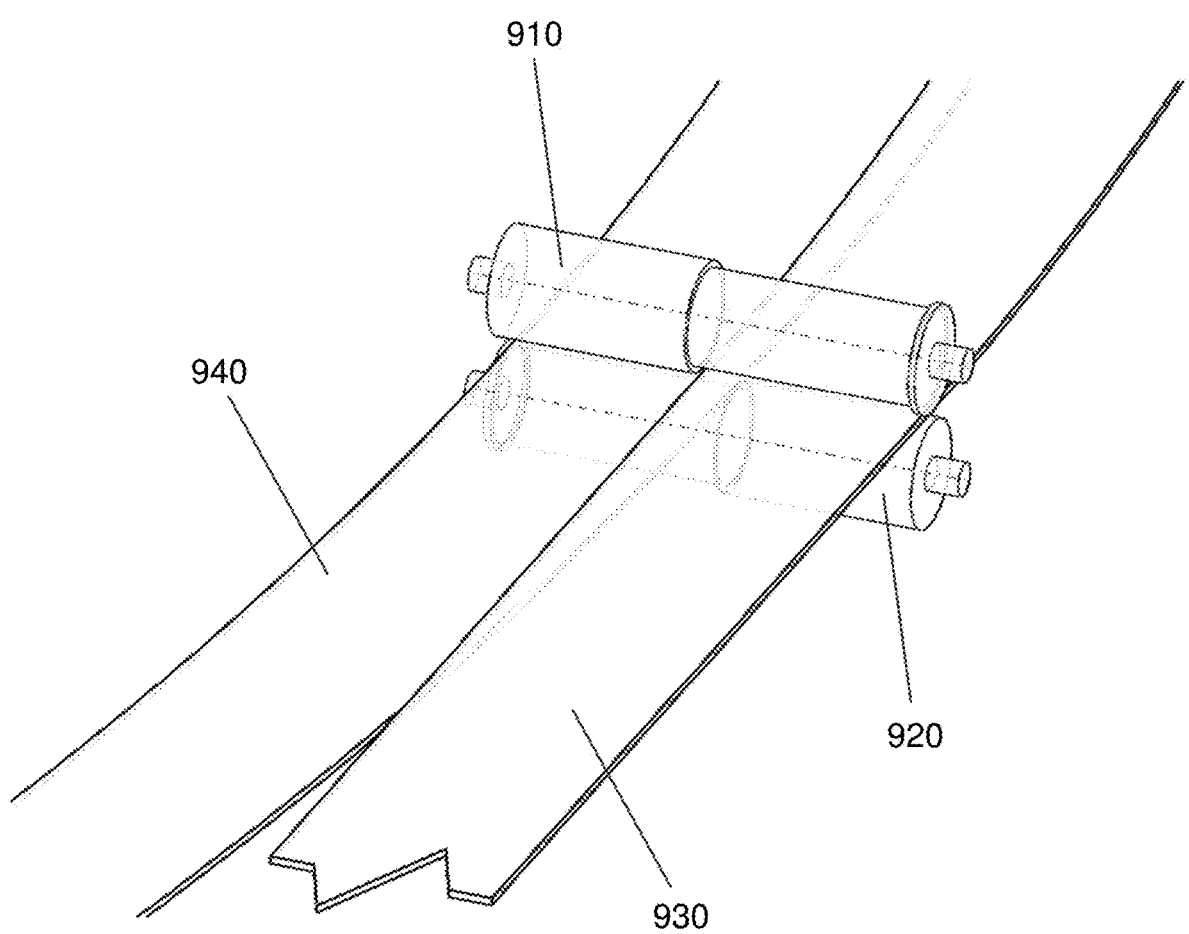
FIG. 9B is a perspective view illustrating the TiG roller assembly of FIG. 9A forming a structure, according to an embodiment of the present invention.

Lower roller 920 includes a shaft 922 about which it rotates and an inner cylinder 924. Inner cylinder 924 and a lip 925 hold inner section of tape 940 in place, along with a portion of an outer cylinder 926. Tape 930 includes a groove 932 and tape 940 includes a tongue 942. Inner cylinder 914 and inner cylinder 924 press tape 930, 940 together, forcing tongue 942 into groove 932. In this manner, TiG roller assembly joins tape sections 930, 940 (i.e., wraps) in the process of forming a structure, as illustrated in FIG. 9B.

Figure 10:
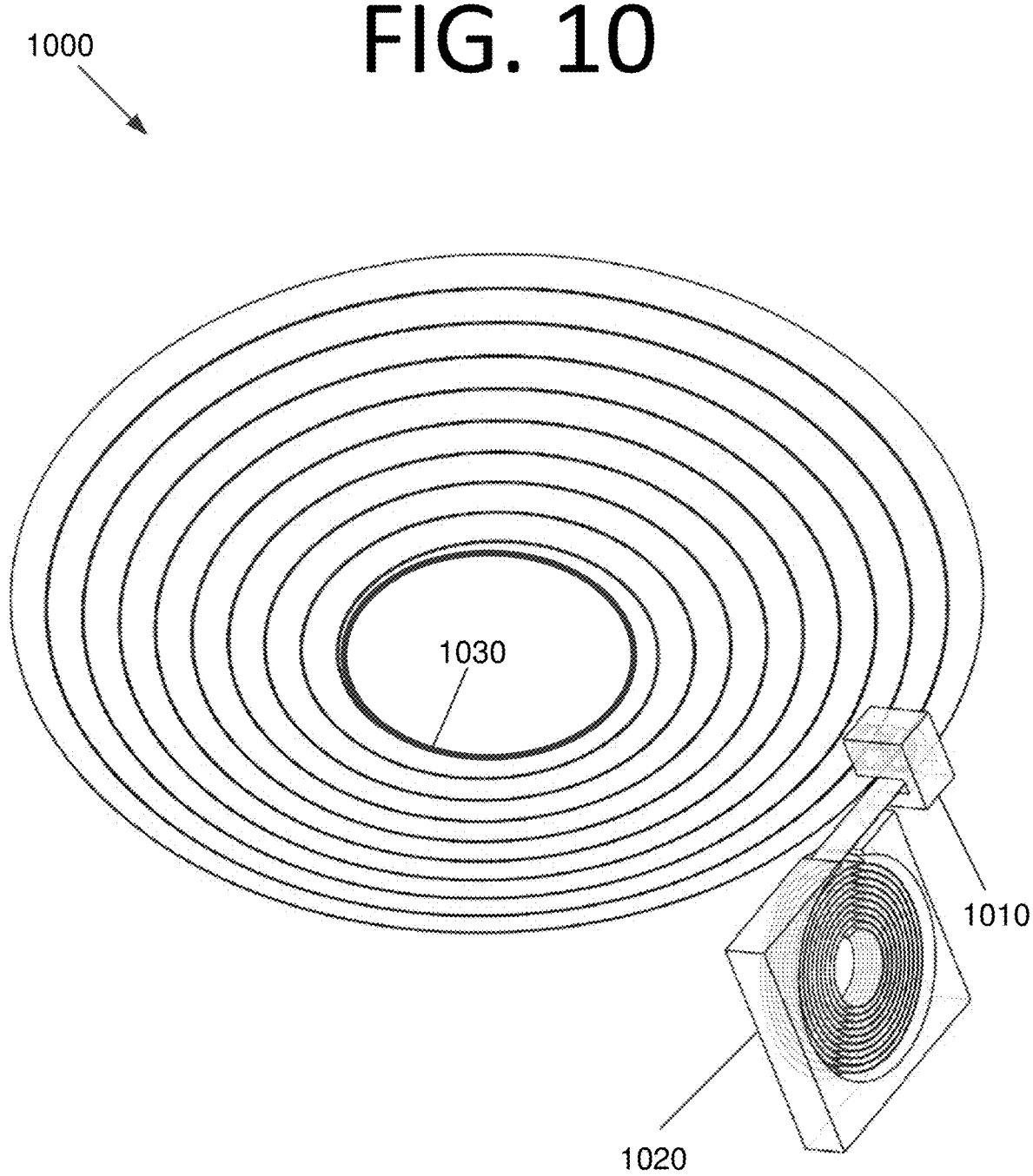
FIG. 10 is a perspective view illustrating a reflector being formed by a joining tractor, according to an embodiment of the present invention.

FIG. 10 is a perspective view illustrating a reflector 1000 being formed by a joining tractor 1010, according to an embodiment of the present invention. Joining tractor 1010 receives tape from spool 1020 and joins it to the previous loop of tape. A retaining ring 1030 forms the initial structure about which reflector 1000 is built.

Figure 11:
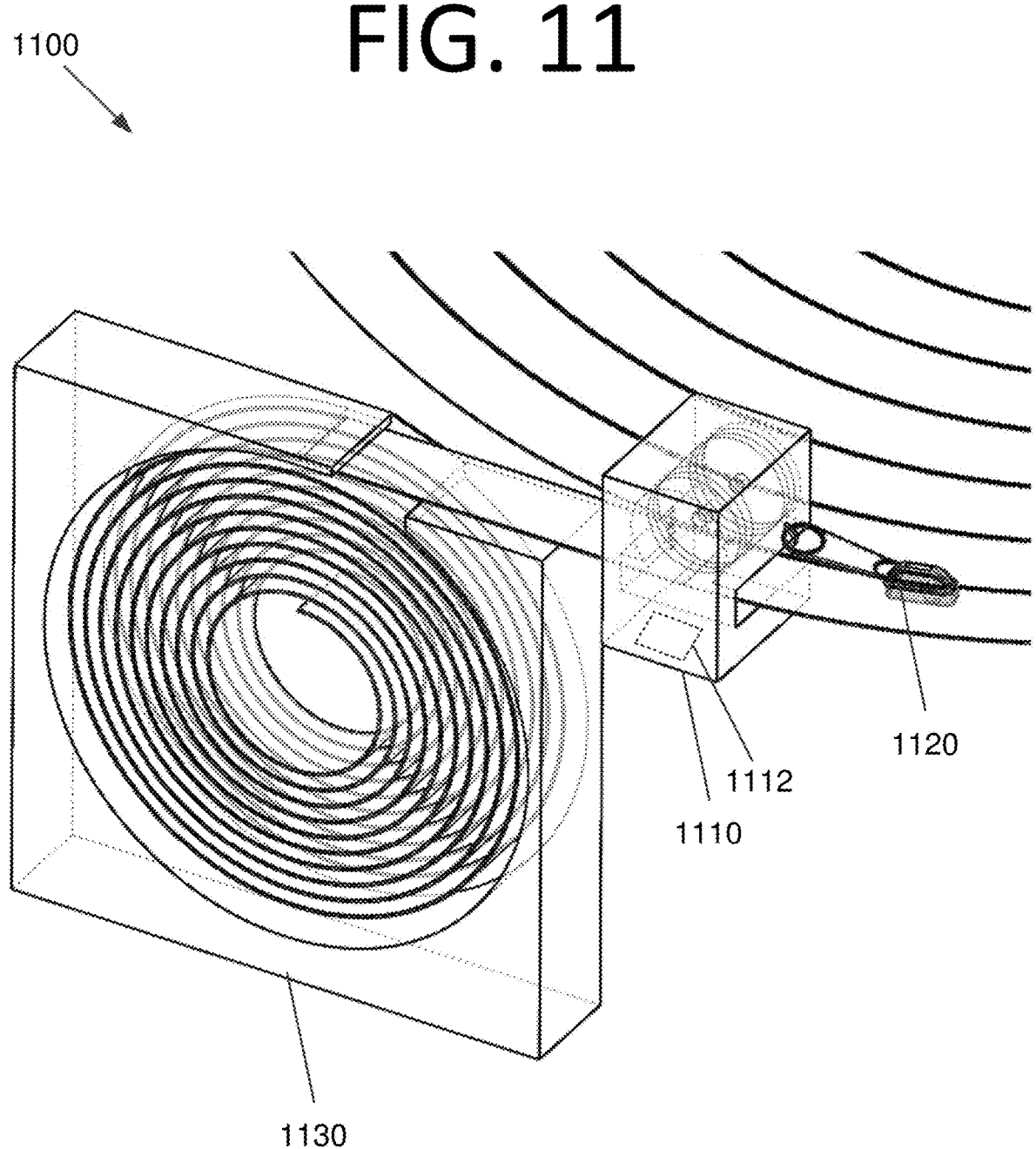
FIG. 11 is a perspective view illustrating a reflector being formed by a joining tractor with a zipper, according to an embodiment of the present invention.

FIG. 11 is a perspective view illustrating a reflector 1100 being formed by a joining tractor 1110 with a zipper 1120, according to an embodiment of the present invention. Joining tractor 1110 receives tape from spool 1130 and joins it to the previous loop of tape via zipper 1130, which is operably connected to joining tractor 1110. Opposite sides of the tape may have mating zipper components such that they may be zipped together.

Joining tractor 1110 also includes a computing system 1112 configured to control the operations of joining tractor 1110. It should be noted that any joining tractor disclosed herein may include a computing system without deviating from the scope of the invention. Computing system 1112 may be computing system 2000 of FIG. 20 in some embodiments.

Figure 12:
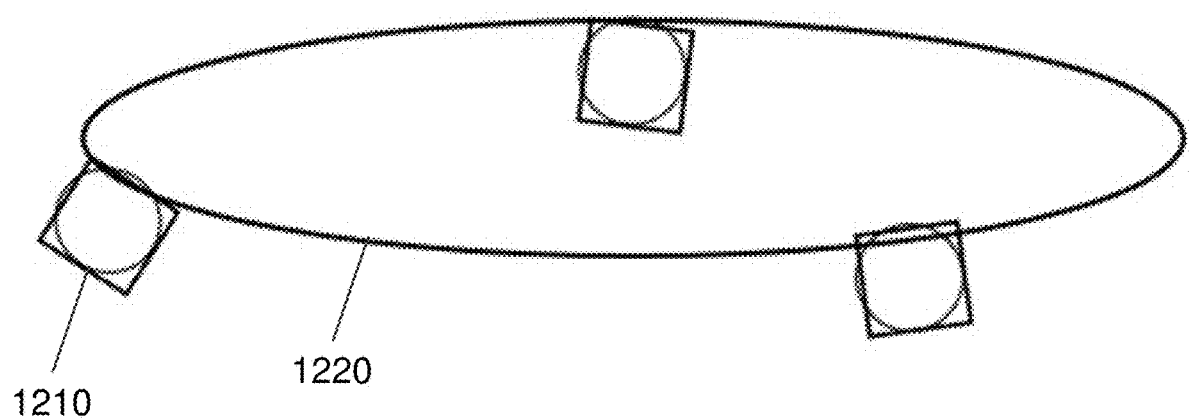
FIG. 12 illustrates a reflector system with multiple joining tractors, according to an embodiment of the present invention.

FIG. 12 illustrates a reflector system 1200 with multiple joining tractors 1210, according to an embodiment of the present invention. In this embodiment, three joining tractors 1210 are spaced at 120 degrees of separation from one another along retaining ring 1220 to maintain vehicle inertial pointing. Similarly, in another embodiment, two joining tractors may be employed spaced 180 degrees from one another along the ring. However, any number of joining tractors with any separation from one another may be employed without deviating from the scope of the invention. In FIG. 12, joining tractors 1210 are shown as attached to the retaining ring prior to deployment. During deployment, joining tractors 1210 would deploy their tap in a plural-spiral (triple-spiral shown), which builds the reflector faster.

Figure 13:
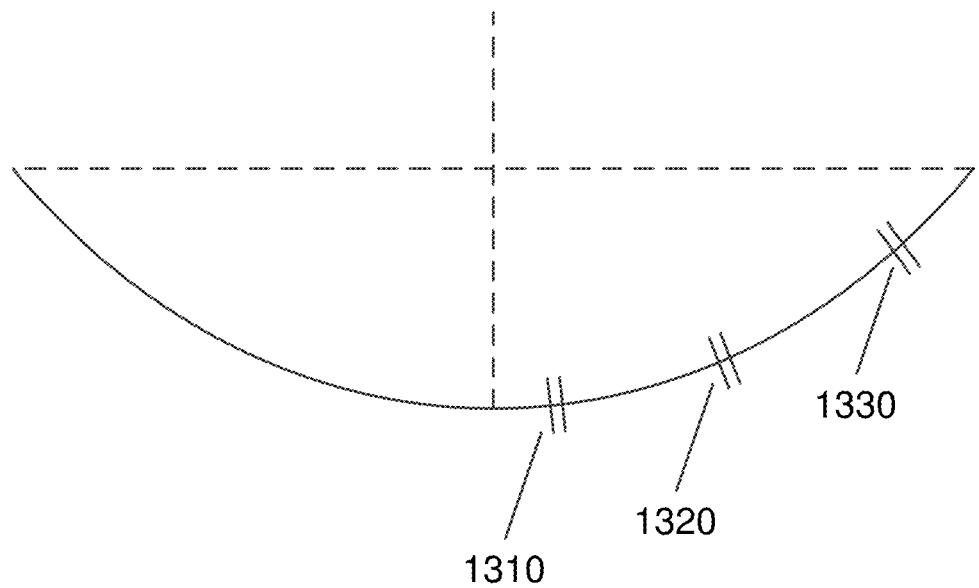
FIG. 13 illustrates the concept of yaw and camber with respect to various wraps of a parabolic reflector, according to an embodiment of the present invention.

FIG. 13 shows a parabolic reflector 1300. Wraps close to the center have a smaller radius of cross-curvature, whereas wraps further from the center have a larger radius of cross-curvature. For instance, the radius of cross curvature of wrap 1320 is larger than that of wrap 1310, and the radius of cross curvature of wrap 1330 is larger than that of wrap 1320. Tapes may be monolithic or mesh structures allowing substantial yaw elasticity in the axis perpendicular to the tape. This selective compliance may enable strains necessary for the varying spiral of sequential joints as the radius of curvature changes while constructing a parabola, for example. Conductive coating may be applied to at least a portion of at least one side of the tape that will form the reflective, concave surface. Coatings are also likely to be applied to the opposite side in order to minimize thermal effects due to solar shadowing and emissivity when in the Earth's shadow. Solar absorptivity of the tape surface should be considered to minimize thermal distortion across the reflector. For polymer tapes, polymers are subject to ultraviolet (UV) degradation and atomic oxygen decay, but metallic coatings can provide a protective barrier.

Geometry Selection

For producing parabolic reflectors from tape, the tape should allow substantial yaw elasticity in the axis perpendicular to the axis perpendicular to the tape, at least for inner wraps. This yaw elasticity should enable strains required for the varying spiral of sequential joints as the radius of curvature changes while constructing a parabola. Static structural stress is highly dependent on geometry. For example, strain in a rectangular tape cross-section in bending is expressed as:

$$\varepsilon = \frac{Mc}{EI}, \text{ where } I = \frac{bH^3}{12}$$

where ε is strain, M is the applied bending moment, c is the distance from the neutral bending axis (half the thickness in this case), and E is the (Young's) modulus of elasticity. I is the cross-sectional (area) moment of inertia, where b is the width and h is the cross-section thickness.

The strongest driver of strain is therefore the thickness, which is cubed. Meshes and extrusion features that locally increase thickness strongly influence the cross-section stiffness (in both bending and yaw) so meshes may be considered as part of the geometry.

Geometry should also be considered for deployment curvature. Preliminary tape curvature was deduced from a simplified hollow disc model to calculate the magnitude of differential circumferential maximum strains. An internal Cassegrain radius of 0.2 meters and a tape width of 0.05 meters would necessitate a maximum yaw strain on the tape of 25% for the first, deployed, inner tape wrap, thus potentially favoring a mesh-type tape with low yaw modulus to allow for strain associated with the radius change. With an outside radius of 5 meters, the last, deployed outer spiral tape wrap would only require approximately 1% yaw strain. Therefore, a pre-perforated tape would require a more yaw-compliant structure on one proximal end (near the internal Cassegrain hole edge) and a less yaw-compliant tape at the distal end (near the parabola's outer edge). If a mesh structure is chosen, it could vary along the tape length to effect the desired yaw compliance at various locations.

Figure 14:
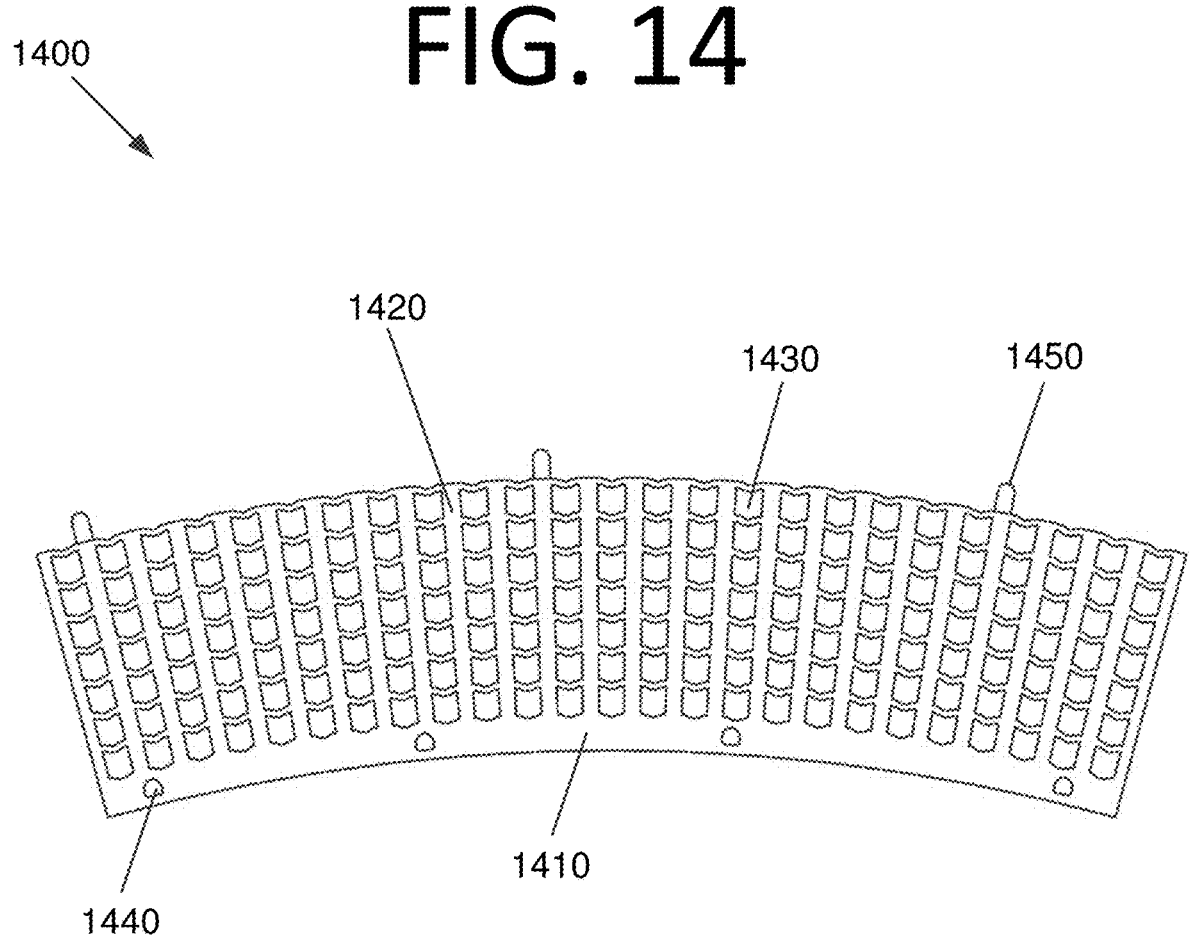
FIG. 14 illustrates a mesh tape concept, according to an embodiment of the present invention.

Such a mesh tape concept is shown in FIG. 14. Tape 1400 includes a monolithic inner edge 1410, radial elements 1420 providing support, and curved flexures 1430 (e.g., gaps) that allow tape 1400 to undergo a tangential curvature stretch or exhibit yaw compliance (e.g., differential squish and/or stretch of tape edges with respect to one another). Mesh holes 1440 interlock with tabs from an adjacent inner section of tape, and tabs 1450 interlock with holes of an adjacent outer section of tape. Flexures 1430 would typically be smaller in practical implementations and are shown larger in FIG. 14 for illustration purposes. Flexures 1430 would be sized at a small fraction of the RF wavelength to effectively provide a continuous electromagnetic reflector for the wavelength. Since the formula for determining the required hole size is complex, flexures 1430 may be sized to be 100 times smaller than the wavelength in some embodiments for margin.

Radial elements 1420 provide strength and stiffness in the radial direction. Curved flexures 1430 between radial elements 1420 provide yaw-elasticity for tangential curvature stretch as the upper (outer) mesh edge, which is stretched with respect to monolithic inner tape edge 1410. Tapes could be flat or pre-curved in their cross-section to more easily reproduce a parabolic shape upon deployment. The joint may be lapped with flat tape or lapped with stair-stepped mortise edges (achievable by extrusion) in order to minimize discontinuities in the reflecting surface.

Because polymers have a low elastic modulus, this property can be exploited to allow spring-back to a preferred multi-axis curvature from a flat-spooled storage state. Thermoplastic tape (meshed or monolithic) could be plastically deformed in yaw as well as curved across its width when heated above its recrystallization temperature, then cooled to produce tape with multi-axis curvature. With sufficient strength, the tape could be spooled within its elastic limits for later deployment and assembly. A mesh coating on a monolithic polymer substrate should be structurally designed to minimize its effect on beneficial yaw elasticity. A shape-memory polymer could be used by heating it to a prescribed temperature after exiting the storage spool to effect a phase-change driven geometry recovery of a preferred shape.

Material Selection

Stress σ is related to strain ε as:

$$\sigma = \varepsilon E$$

where σ is stress, so the Young's modulus of the material E has only a linear effect on stress. Due to the linear effect of modulus on strength, a broad suite of potential materials may be used including, but not limited to metals, coated polymers, conductive polymers, and shape-memory polymers. Metals and conductively coated polymers may be particularly suitable candidates. Metals have a high modulus of elasticity and can be thin (for stowed compactness), while exhibiting considerable strength. Polymers have lower densities, which can be an advantage in lowering cross-sectional modulus. Polymers would typically require more volumetric storage than metals, yet they can be extruded when manufactured to add functional edge details for joining. Polymers may be selected based on extrudability. When elastic modulus and strength are considered, modern engineering polymers approach, and sometimes overlap, the performance envelope of metals.

Polyetheretherketone (PEEK—e.g., Ketron™), polyetherimide (PEI—e.g., Ultem™), and glass or carbon filled high-modulus polymers approach the capability of metals. However, with lower stiffness and density, polymers may require increased volume of material versus metals to achieve stiffness in deployed structures. Stiffness and strength requirements are primarily determined by angular acceleration loads from satellite pointing changes for parabolic reflectors. Thermoplastic polymers have a distinct producibility advantage being relatively easily moldable and extrudable.

Joining Mechanisms

Joining may be accomplished by pre-applied adhesives, spot or continuous hot-melt joining (using ultrasonic or resistance heating), a TiG snap joint (continuous or interrupted) on adjacent edges/faces similar to zip re-sealable storage bags, a zipper, tabbed interlocks, or any other approach without deviating from the scope of the invention. Some examples of zip re-sealable fasteners are found in U.S. Pat. Nos. 2,558,367, 2,613,421, and 8,689,841, the disclosures of which are incorporated herein by reference. Zipper-type designs may considerably simplify the design of the joining tractor.

Electrical conductivity across the joint may be carefully addressed. Tapes may be fabricated by laser-cutting. Joining tools and fixtures may then be used to join tape into rudimentary edge-joined structures.

Tabbed interlock tapes may significantly improve compactness (due to flatness of the tape) and structural performance. A single tape with slots and tabs on opposite sides could be the joining mechanism for a spirally wrapped parabola. A variable, linear array of slots on the inner edge could engage tabs on the gradually stretched previous wrap outer tape edge. This synchronized stretching could build a parabolic reflector assembly in an almost automatic zipper-like fashion.

Figure 15:
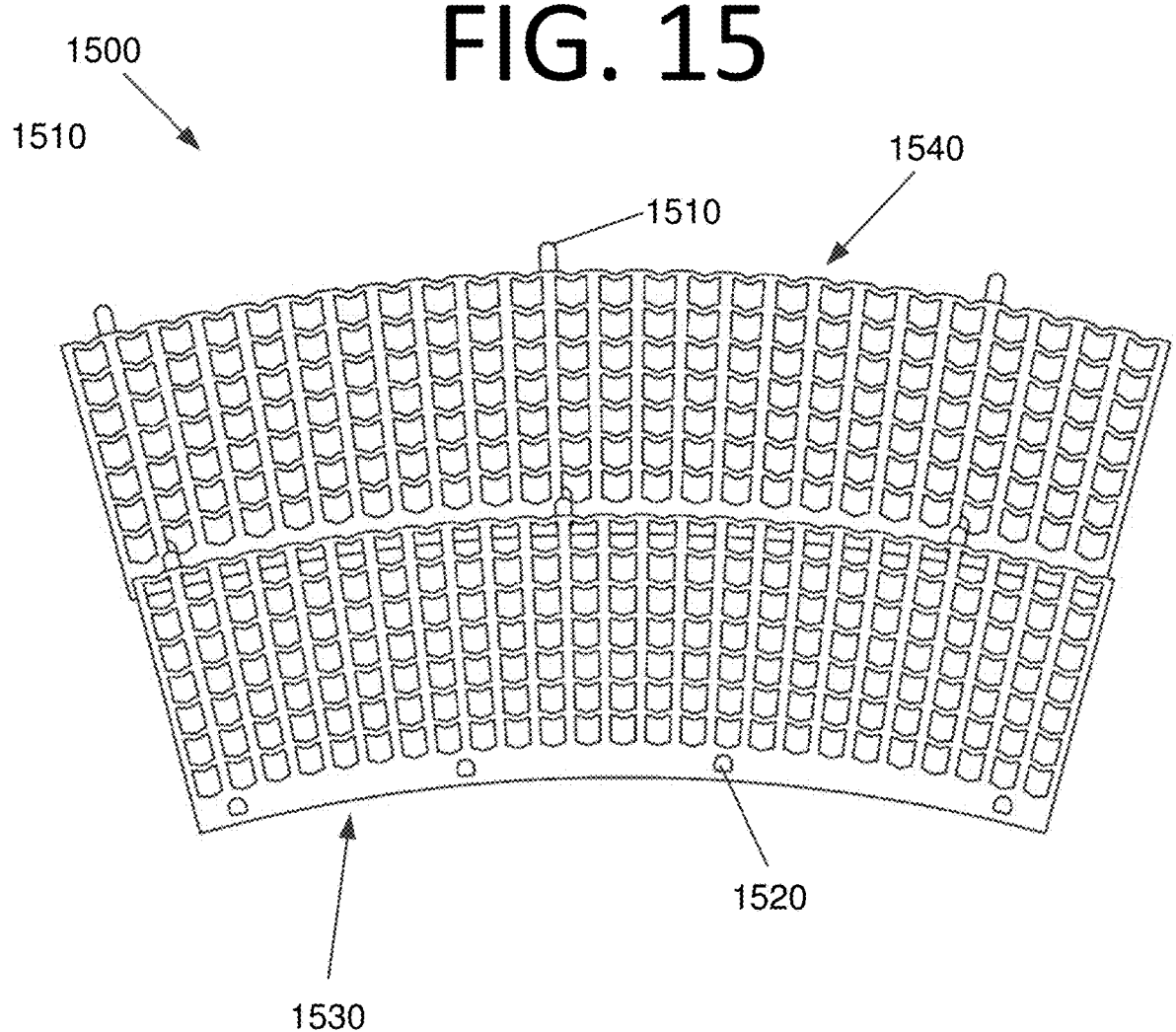
FIG. 15 illustrates a tabbed interlock tape concept, according to an embodiment of the present invention.

Interlock tapes 1500 of FIG. 15 show such a design. Each wrap of tape has tabs 1510 and slots 1520. Tabs of inner wrap 1530 go through slots of outer wrap 1540. Outer wrap 1540 laps under inner wrap 1530 in this embodiment.

Figure 16:
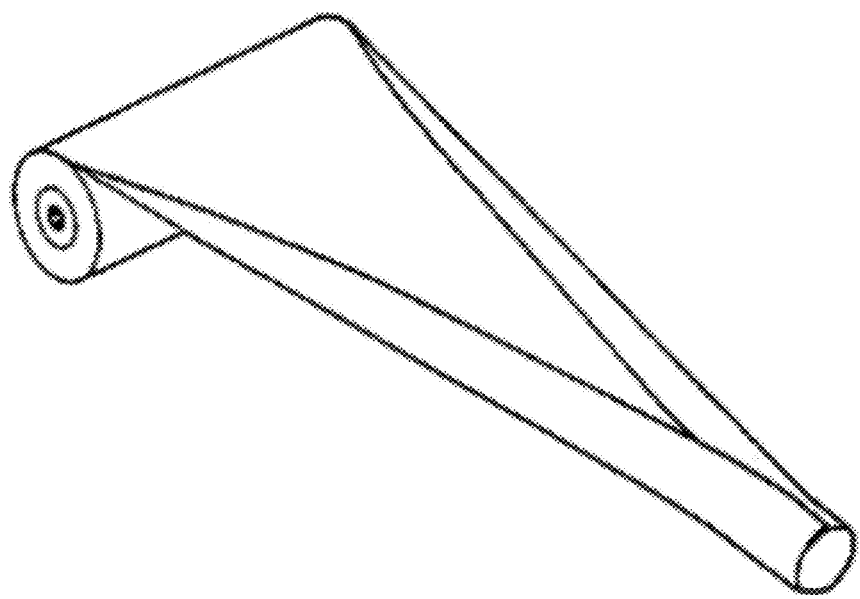
FIG. 16 is a perspective view illustrating a mono-stem.
Figure 17:
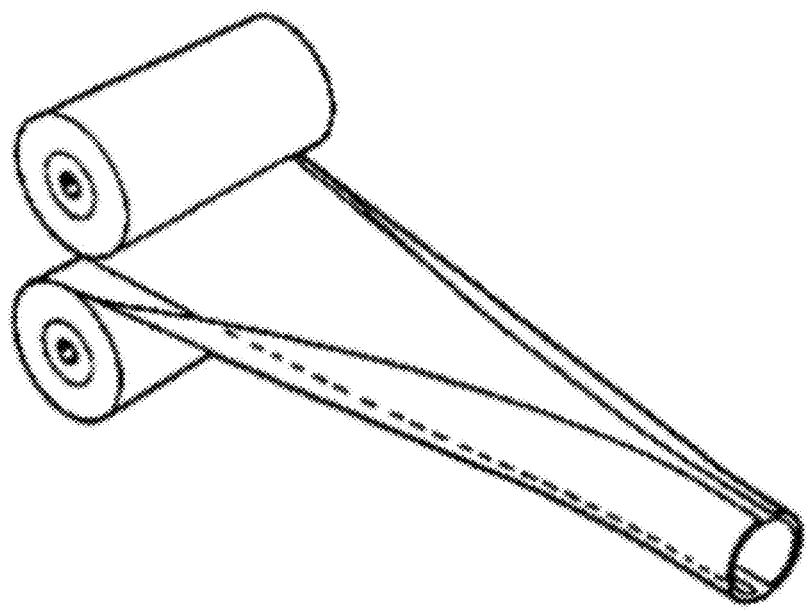
FIG. 17 is a perspective view illustrating a bi-stem.
Figure 18:
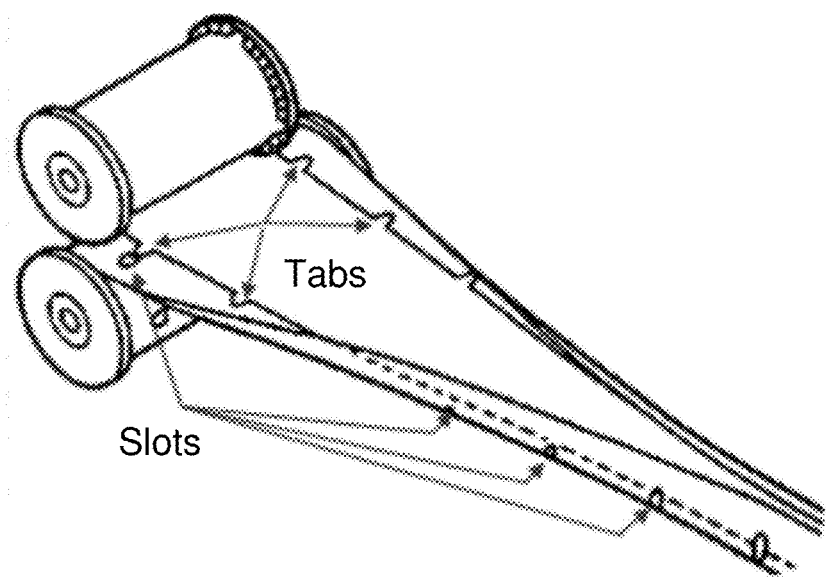
FIG. 18 is a perspective view illustrating an interlocking bi-stem.

Tabbed interlocks have been successfully demonstrated in mono-stems and bi-stems made of thin metal tape deployed from a spool to form high aspect ratio boom structures. See mono-stem 1600 of FIG. 16, bi-stem 1700 of FIG. 17, and interlocking bi-stem 1800 of FIG. 18. Bi-stems have been well-tested with respect to their application as the original booms for deploying the solar arrays for the Hubble Space Telescope.

Figure 19:
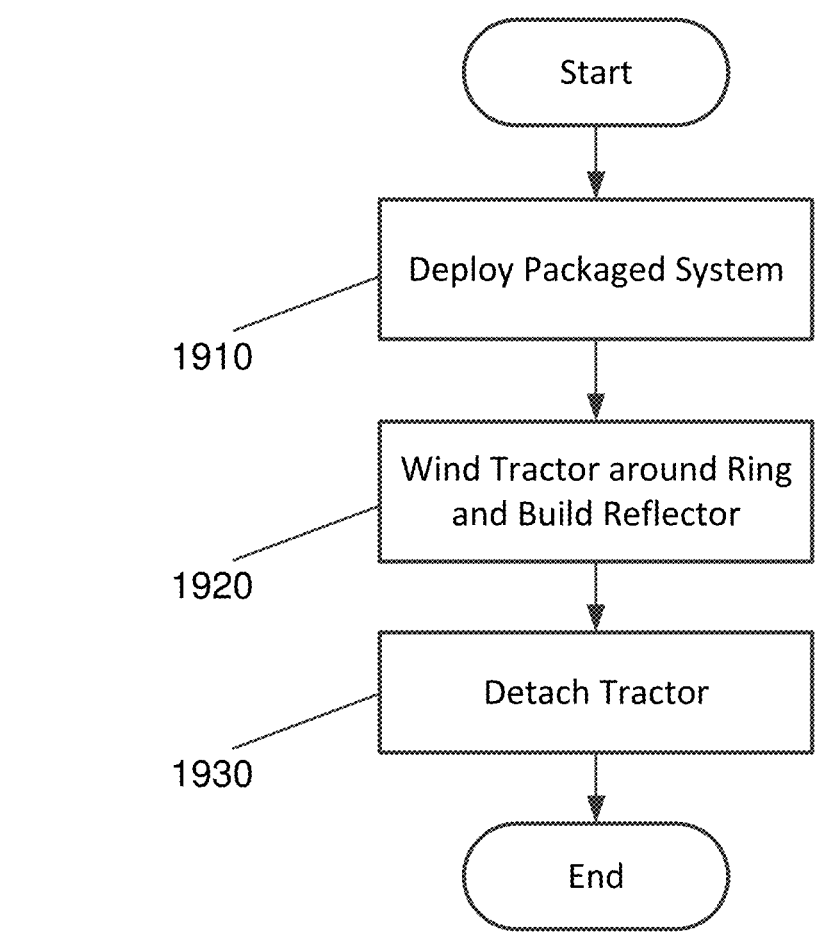
FIG. 19 is a flowchart illustrating a process for forming a reflector using tape, according to an embodiment of the present invention.

FIG. 19 is a flowchart 1900 illustrating a process for forming a reflector using tape, according to an embodiment of the present invention. The process begins with deploying a packaged reflector system at 1910 once the space vehicle is in orbit. This packaged system includes a joining tractor, a ring or other initial structural member, and a spool of tape. The joining tractor then winds around the ring and builds the reflector at 1920. Consecutive wraps of tape may be joined together by any suitable mechanism, such as spot or continuous hot-melt joining, TiG snap joints, zippers, tabbed interlocks, etc. Once the joining tractor has finished wrapping the tape, the joining tractor is detached at 1930 either by the space vehicle or by the joining tractor's own actions (e.g., it may simply run off the end of the tape into space and drift away, or run off and be retrieved by the space vehicle via a tether, for instance).

Figure 20:
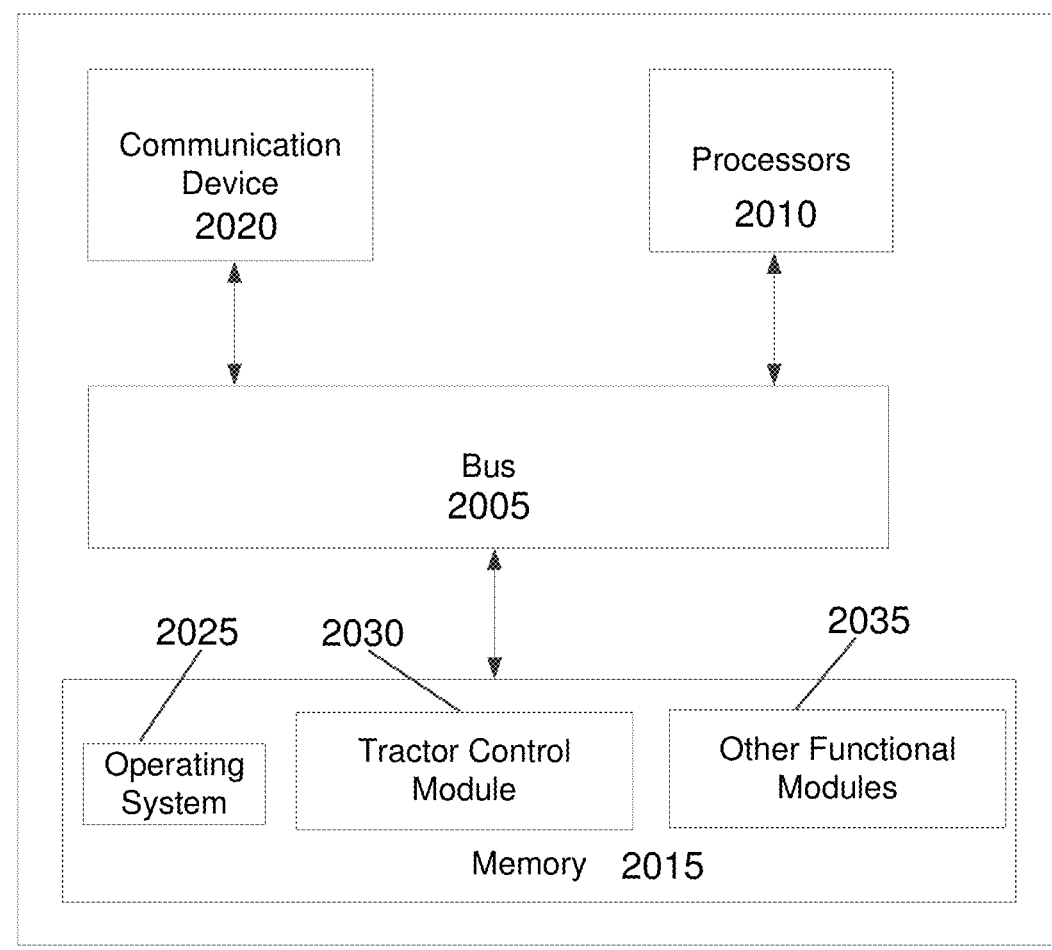
FIG. 20 is a block diagram illustrating a computing system configured to control a joining tractor, according to an embodiment of the present invention.

FIG. 20 is a block diagram illustrating a computing system 2000 configured to control a joining tractor, according to an embodiment of the present invention. Computing system 2000 includes a bus 2005 or other communication mechanism for communicating information, and processor(s) 2010 coupled to bus 2005 for processing information. Communication could be wireless, hardwired, via laser telemetry, etc. in some embodiments. Processor(s) 2010 may be any type of general or specific purpose processor, including a central processing unit (CPU), a graphics processing unit (GPU), an application specific integrated circuit (ASIC), a field programmable gate array (FPGA), or any combination thereof. Processor(s) 2010 may also have multiple processing cores, and at least some of the cores may be configured to perform specific functions. Multi-parallel processing may be used in some embodiments.

Computing system 2000 further includes a memory 2015 for storing information and instructions to be executed by processor(s) 2010. Memory 2015 can be comprised of any combination of random access memory (RAM), read only memory (ROM), flash memory, cache, static storage such as a magnetic or optical disk, or any other types of non-transitory computer-readable media or combinations thereof. Memory 2015 may be located on the ground (i.e., Earth) in the Internet cloud, on computing system 2000 itself, or any combination thereof. Additionally, computing system 2000 includes a communication device 2020, such as a transceiver and antenna, to wirelessly provide access to a communications network.

Non-transitory computer-readable media may be any available media that can be accessed by processor(s) 2010 and may include volatile media, non-volatile media, or both. The media may be removable, non-removable, or both. Any suitable media may be used without deviating from the scope of the invention.

Memory 2015 stores software modules that provide functionality when executed by processor(s) 2010. The modules include an operating system 2025 for computing system 2000. The modules further include a tractor control module 2030 that is configured to perform any of the tractor operations disclosed herein and/or derivatives thereof. Computing system 2000 may include one or more additional functional modules 2035 that include additional functionality.

One skilled in the art will appreciate that a "system" could be embodied as an embedded computing system, a computer, a server, a system on a chip, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data. Memory may be located on a cell, on the ground (i.e., Earth), in the internet cloud, or any combination thereof.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 19 may be performed by a computer program, encoding instructions for a processor to perform at least the process described in FIG. 19, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. Memory may be located on the ground (i.e., Earth), in the Internet cloud, locally, or any combination thereof. The computer program may include encoded instructions for controlling the processor to implement the process described in FIG. 19, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

Figure 21A:
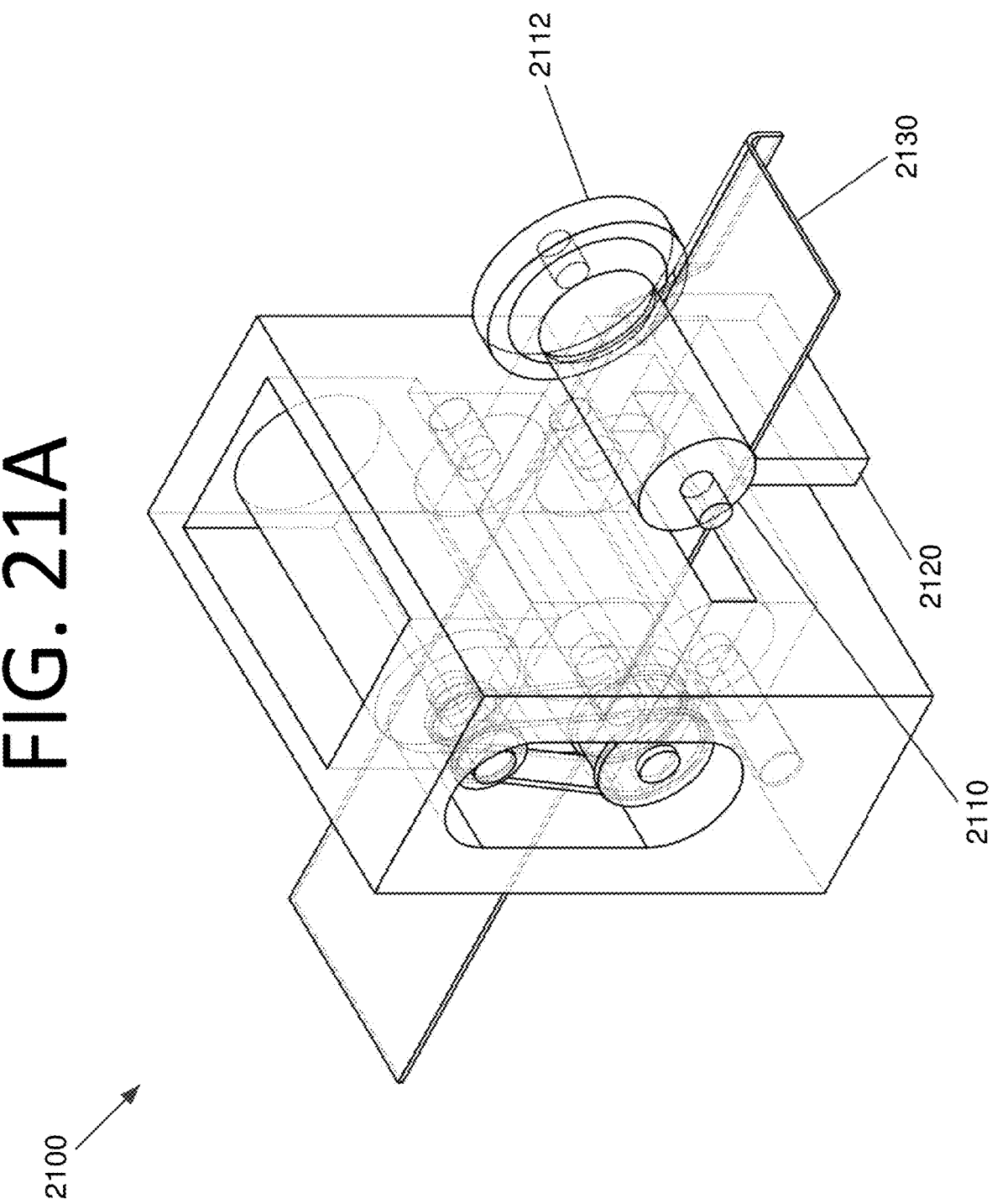
FIG. 21A is a left perspective view illustrating a joining tractor configured to bend tape using a contoured roller and a die, according to an embodiment of the present invention.
Figure 21B:
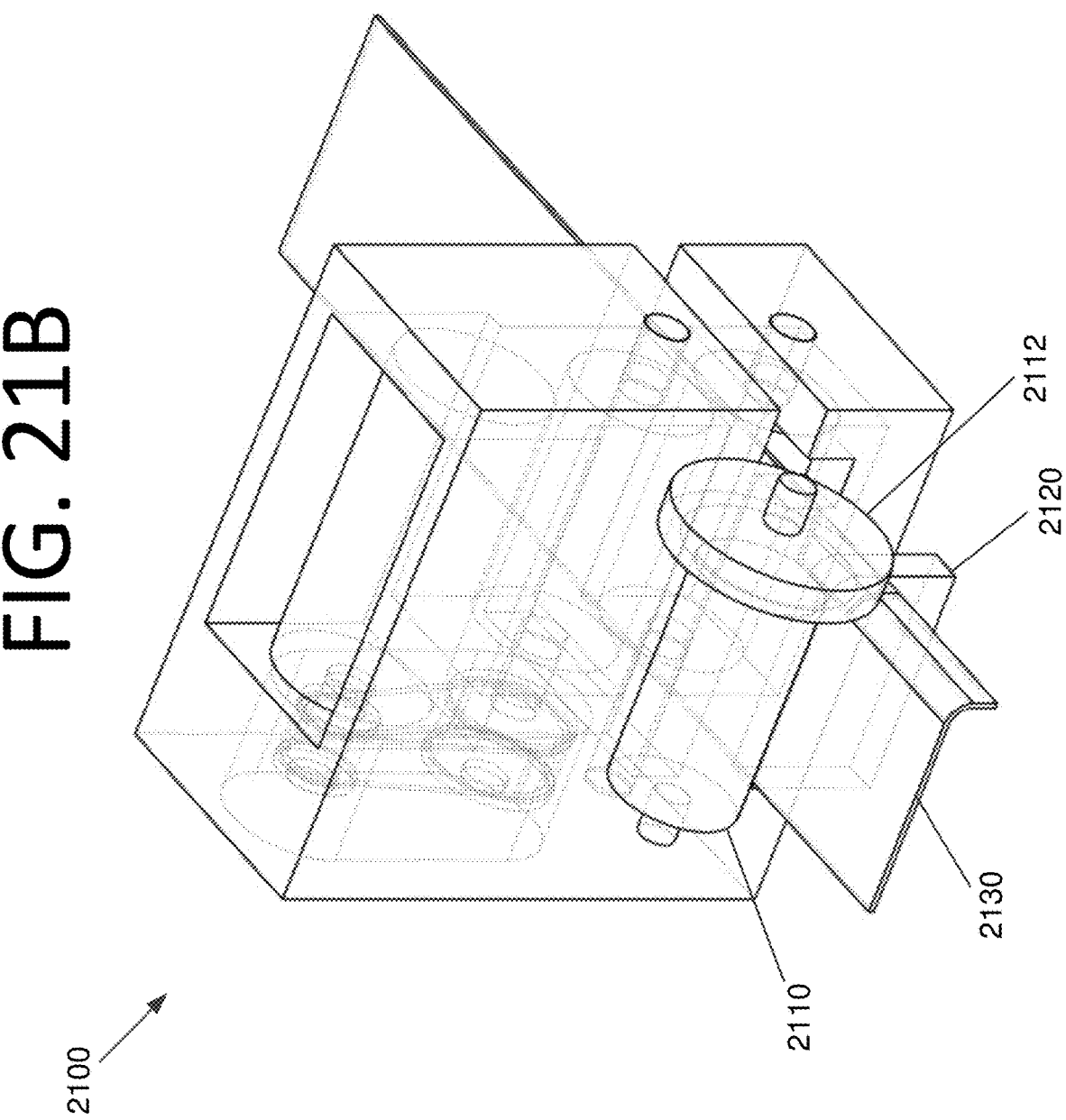
FIG. 21B is a right perspective view illustrating the joining tractor of FIG. 21A, according to an embodiment of the present invention.

FIGS. 21A and 21B illustrate a joining tractor configured to bend tape 2130 using a contoured roller 2110 and a die 2120, according to an embodiment of the present invention. Contoured roller 2110 (and/or one of the depicted internal rollers) pulls tape 2130. A contoured section 2112 of roller 2110 and a die 2120 bend tape 2130 as it passes therebetween.

Figure 22:
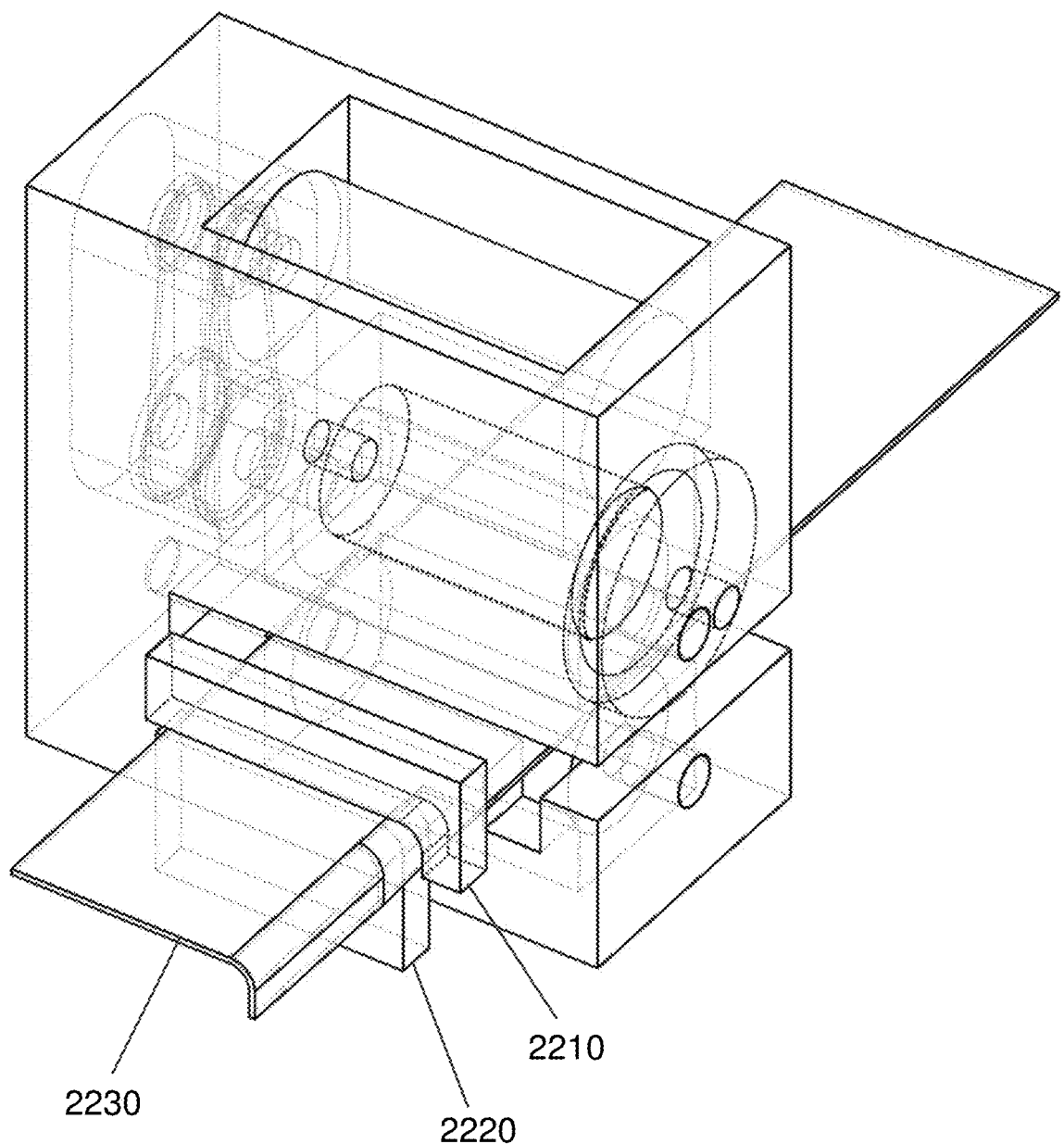
FIG. 22 is a right perspective view illustrating a joining tractor configured to bend tape using a pair of dies, according to an embodiment of the present invention.

FIG. 22 is a right perspective view illustrating a joining tractor 2200 configured to bend tape using a pair of dies 2210, 2220, according to an embodiment of the present invention. Tape 2230 is forced to pass between an upper die 2210 and a lower die 2220. As tape 2230 does so, it is bent into a desired shape dictated by dies 2210, 2220.

It should be noted that any number, location, and/or shape of contoured rollers and/or dies may be used without deviating from the scope of the invention. Also, tape may be bent into any desired shape. Furthermore, the dies and/or contoured rollers may be moved during construction in order to achieve different shapes as desired during a specific part of the construction using suitable motors, actuators, or the like. The specifics of tape shape at any given time during construction may be programmed into a computing system of the joining tractor, such as computing system 2000 of FIG. 20.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a spool comprising tape, the spool configured to dispense the tape;
   a joining tractor configured to receive the tape from the spool and join a newly dispensed section tape to an adjacent inner section of the tape or to a foundation ring; and
   juxtaposed rollers on opposite sides of the tape that are configured to guide the tape as the tape is joined, at least one of the juxtaposed rollers configured to provide propulsion for the joining tractor, wherein
   the joining tractor is configured to move along the foundation ring, and subsequently, the adjacent inner section of tape, to attach a next section of the tape outside of the foundation ring or the adjacent inner section of the tape.

2. The apparatus of claim 1, wherein the foundation ring is circular, elliptical, another two-dimensional geometric shape, non-planar, irregular, an open-ended geometric shape, or any combination thereof.

3. The apparatus of claim 1, wherein the tape is preformed along some or all of its length to have a desired yaw radius or camber based on a position of a respective section of the tape.

4. The apparatus of claim 1, wherein the tape is formed upon being dispensed.

5. The apparatus of claim 1, wherein the tape is joined by the joining tractor using pre-applied adhesives, spot or continuous hot-melt joining, Tongue-in-Groove (TiG) snap joints, a zipper, tabbed interlocks, hook-and-loop fasteners, or any combination thereof.

6. The apparatus of claim 1, further comprising:
   a foot on an opposite side of the tape from a roller of the juxtaposed rollers, the foot configured to guide the tape as the tape is joined.

7. The apparatus of claim 1, wherein the tape is stored in the spool in a conical or otherwise tapered shape.

8. The apparatus of claim 1, further comprising:
   a housing comprising an upper portion, an upper roller of the juxtaposed rollers, a lower portion, and a lower roller of the juxtaposed rollers, the upper portion housing the upper roller and the lower portion housing the lower roller;
   a motor roller; and
   a belt operably connected to the motor roller and the upper roller such that the motor roller drives the belt, and thus rotates the upper roller such that the joining tractor moves along the tape, wherein
   the tape passes between the upper roller and the lower roller.

9. The apparatus of claim 1, wherein the tape has a mesh design that comprises a monolithic inner edge, radial elements extending from the monolithic inner edge that provide structural support, and curved flexures that allow the tape to exhibit yaw compliance.

10. The apparatus of claim 1, wherein the tape is reflective, and a size of the flexures is sufficiently small to provide a continuous electromagnetic reflector for a desired radio frequency wavelength.

11. The apparatus of claim 1, further comprising:
    a cutting mechanism configured to cut the tape.

12. The apparatus of claim 1, further comprising:
    a computing system configured to control operation of the apparatus.

13. The apparatus of claim 1, wherein
    the apparatus further comprises at least one die, at least one of the juxtaposed rollers is a contoured roller, or both, and
    the tape is pushed, pulled, or both, across the at least one die, the at least one contoured roller, or both, such that the tape is formed into a desired shape.

14. A system for creating a structure with tape, comprising:
    a foundation ring that provides a foundation for the structure;
    a spool containing tape, the spool configured to dispense the tape;
    a joining tractor configured to receive the tape and join newly dispensed tape from the spool to an adjacent inner section of the tape or to the foundation ring, the joining tractor configured to move along the foundation ring, and subsequently, the adjacent inner section of the tape to attach the newly dispensed tape outside of the foundation ring or the adjacent inner section of the tape; and
    juxtaposed rollers on opposite sides of the tape that are configured to guide the tape as the tape is joined, at least one of the juxtaposed rollers configured to provide propulsion for the joining tractor.

15. The system of claim 14, further comprising:
    one or more additional joining tractors that are initially spaced apart from one another on the foundation ring, the joining tractors configured to form the structure using multiple spirals of tape.

16. An apparatus, comprising:
    a spool comprising tape, the spool configured to dispense the tape;
    a joining tractor configured to receive the tape from the spool and join a newly dispensed section tape to an adjacent inner section of the tape or to a foundation ring;
    juxtaposed rollers on opposite sides of the tape that are configured to guide the tape as the tape is joined, at least one of the juxtaposed rollers configured to provide propulsion for the joining tractor; and
    a computing system configured to control operation of the apparatus, wherein the joining tractor is configured to move along the foundation ring, and subsequently, the adjacent inner section of tape, to attach a next section of the tape outside of the foundation ring or the adjacent inner section of the tape.

17. The apparatus of claim 16, further comprising:

a housing comprising an upper portion, an upper roller of the juxtaposed rollers, a lower portion, and a lower roller of the juxtaposed rollers, the upper portion housing the upper roller and the lower portion housing the lower roller;

a motor roller; and a belt operably connected to the motor roller and the upper roller such that the motor roller drives the belt, and thus rotates the upper roller such that the joining tractor moves along the tape, wherein the tape passes between the upper roller and the lower roller.

* * * * *